(12) United States Patent
Kennedy et al.

(10) Patent No.: US 10,599,161 B2
(45) Date of Patent: Mar. 24, 2020

(54) IMAGE SPACE MOTION PLANNING OF AN AUTONOMOUS VEHICLE

(71) Applicant: Skydio, Inc., Redwood City, CA (US)

(72) Inventors: Ryan David Kennedy, San Francisco, CA (US); Peter Benjamin Henry, San Francisco, CA (US); Hayk Martirosyan, San Francisco, CA (US); Jack Louis Zhu, Redwood City, CA (US); Abraham Galton Bachrach, Redwood City, CA (US); Adam Parker Bry, Redwood City, CA (US)

(73) Assignee: SKYDIO, INC., Redwood City, CA (US)

( * ) Notice: Subject to any disclaimer, the term of this patent is extended or adjusted under 35 U.S.C. 154(b) by 242 days.

(21) Appl. No.: 15/671,743

(22) Filed: Aug. 8, 2017

(65) Prior Publication Data

US 2019/0050000 A1    Feb. 14, 2019

(51) Int. Cl.
| | |
|---|---|
| *G05D 1/10* | (2006.01) |
| *G08G 5/00* | (2006.01) |
| *B64C 39/02* | (2006.01) |
| *G06T 7/593* | (2017.01) |
| *G06T 17/05* | (2011.01) |
| *G06K 9/00* | (2006.01) |

(Continued)

(52) U.S. Cl.
CPC .......... *G05D 1/101* (2013.01); *B64C 39/024* (2013.01); *G06K 9/0063* (2013.01); *G06T 7/246* (2017.01); *G06T 7/277* (2017.01); *G06T 7/593* (2017.01); *G06T 17/05* (2013.01); *G08G 5/0069* (2013.01); *G08G 5/045* (2013.01); *B64C 2201/141* (2013.01); *G06T 2207/10021* (2013.01); *G06T 2207/10032* (2013.01); *G06T 2207/20081* (2013.01); *G06T 2207/20084* (2013.01); *G06T 2207/30188* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 3,992,707 A | * | 11/1976 | Schmidtlein | G01S 7/10 342/58 |
| 5,155,683 A | * | 10/1992 | Rahim | G05D 1/0038 180/168 |

(Continued)

*Primary Examiner* — Shelley Chen
(74) *Attorney, Agent, or Firm* — Perkins Coie LLP

(57) ABSTRACT

An autonomous vehicle that is equipped with image capture devices can use information gathered from the image capture devices to plan a future three-dimensional (3D) trajectory through a physical environment. To this end, a technique is described for image-space based motion planning. In an embodiment, a planned 3D trajectory is projected into an image-space of an image captured by the autonomous vehicle. The planned 3D trajectory is then optimized according to a cost function derived from information (e.g., depth estimates) in the captured image. The cost function associates higher cost values with identified regions of the captured image that are associated with areas of the physical environment into which travel is risky or otherwise undesirable. The autonomous vehicle is thereby encouraged to avoid these areas while satisfying other motion planning objectives.

26 Claims, 18 Drawing Sheets

(51) Int. Cl.
    *G06T 7/246*     (2017.01)
    *G08G 5/04*     (2006.01)
    *G06T 7/277*     (2017.01)

(56) References Cited

U.S. PATENT DOCUMENTS

| | | | | |
|---|---|---|---|---|
| 6,748,325 | B1* | 6/2004 | Fujisaki | G01C 21/00 |
| | | | | 701/301 |
| 9,697,736 | B2* | 7/2017 | Dunsky | G08G 5/00 |
| 2006/0069497 | A1* | 3/2006 | Wilson, Jr. | G05D 1/0044 |
| | | | | 701/120 |
| 2014/0316616 | A1* | 10/2014 | Kugelmass | G05D 1/101 |
| | | | | 701/8 |
| 2016/0325753 | A1* | 11/2016 | Stein | B60W 40/06 |
| 2017/0140245 | A1* | 5/2017 | Kraft | G06K 9/6218 |
| 2017/0337824 | A1* | 11/2017 | Chen | G08G 5/0086 |
| 2019/0019409 | A1* | 1/2019 | Farr | G01C 21/32 |
| 2019/0094888 | A1* | 3/2019 | Hiroi | H04N 9/3185 |

* cited by examiner

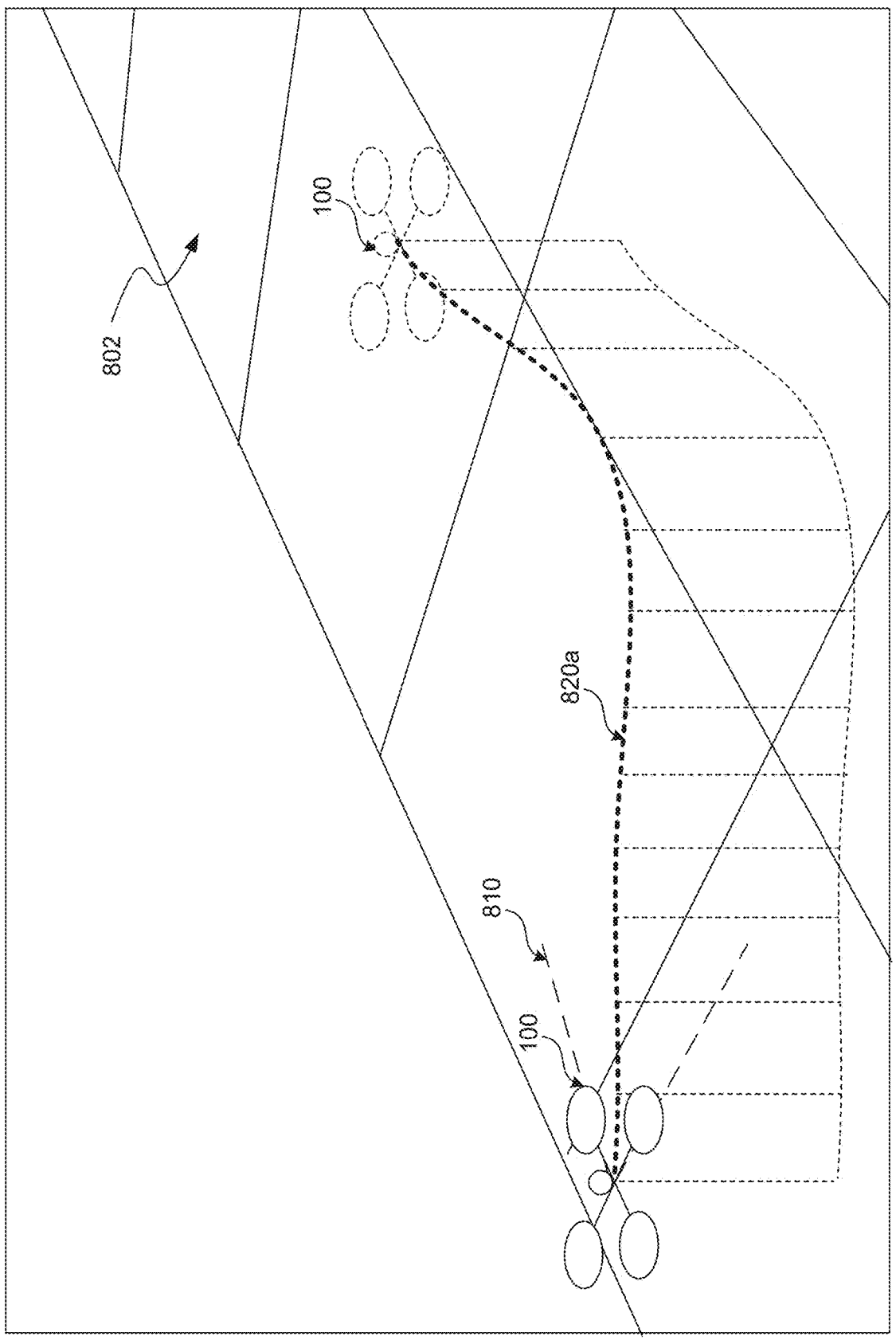

IMAGE SPACE MOTION PLANNING OF AN AUTONOMOUS VEHICLE

TECHNICAL FIELD

The present disclosure generally relates to motion planning for an autonomous vehicle based on captured images of a physical environment.

BACKGROUND

Increasingly, digital image capture is being used to guide autonomous vehicle navigation systems. For example, an autonomous vehicle with an onboard image capture device can be configured to capture images of a surrounding physical environment that are then used to estimate a position and/or orientation of the autonomous vehicle within the physical environment. This process is generally referred to as visual odometry. An autonomous navigation system can then utilize these position and/or orientation estimates to guide the autonomous vehicle through the physical environment.

BRIEF DESCRIPTION OF THE DRAWINGS

FIG. 8A shows an example representation of a UAV in flight along a three-dimensional (3D) trajectory through a physical environment;

DETAILED DESCRIPTION

Overview

A vehicle such as a UAV that is equipped with cameras can be configured to autonomously navigate a physical environment using motion planning that is based at least in part on images captured by the cameras. In some cases, captured images are used to estimate depth to three-dimensional (3D) points in the physical environment. These depth estimates can then be used to generate 3D models of the physical environment through which a 3D trajectory (i.e., path of motion) can be planned that satisfies certain objectives while avoiding obstacles.

In some situations, regions of the captured images may be unreliable for such purposes for a number of reasons. For example, certain objects with complex shapes such as trees with intermittent foliage may lead to uncertain and therefore unreliable depth estimates. To address these challenges, techniques are introduced herein for image space based motion planning of an autonomous vehicle. In an example embodiment, an image of a physical environment is processed to identify regions that are associated with a particular property such as depth estimates below a threshold level of confidence.

Figure 1:
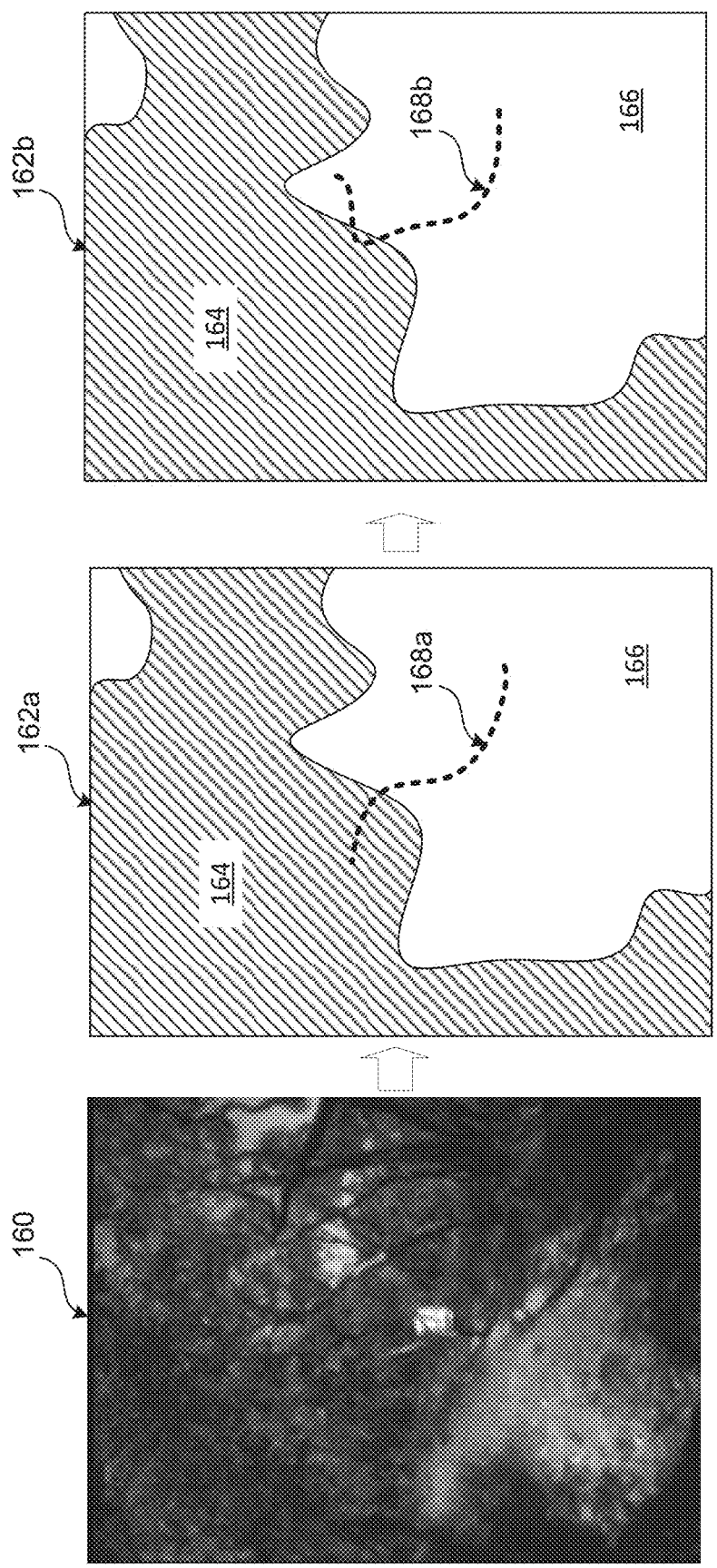
FIG. 1 shows a sequence of images illustrating a technique for image space based motion planning for an autonomous vehicle.

FIG. 1 shows an example image 160 captured by an autonomous UAV in flight through a physical environment. As shown in FIG. 1, the captured image is processed to identify certain regions 164 (represented by the hatched area) and 166 (represented by the solid area), for example, as represented in the region map 162a. In the example shown in FIG. 1, the two regions may be associated with different confidence levels for depth estimates made based on the captured image 160. For example, region 164 may include pixels with depth estimates below a threshold level of confidence (i.e., invalid depth estimates) and region 166 may include depth estimates at or above the threshold level of confidence (i.e., valid depth estimates).

A predicted or planned 3D trajectory of the autonomous UAV is then projected into the image space of the captured image, for example, as represented in a region map 162a by the dotted line 168a. The planned trajectory of the autonomous UAV can then be optimized based on an image space analysis of the relationship between the projection of the trajectory 168 and the identified one or more regions 164 and 166 in the captured image. The planned trajectory can be optimized based on a cost function that associates regions 164 and/or 166 with certain levels of risk of collision with physical object in the physical environment. For example, region 164 includes pixels with uncertain and therefore invalid depth estimates. Accordingly, an assumption can be made that traveling towards an area of the physical environment depicted in region 164 poses a greater risk (e.g., of collision) than traveling towards an area of the physical environment depicted in region 166. By optimizing the planned trajectory to minimize an associated cost, the autonomous UAV is encouraged to fly towards areas with more certain depth estimates and therefore less risk of unforeseen collisions, for example, as indicated by projection of the optimized path 168b depicted in region map 162b.

Example Implementation of an Autonomous Vehicle

Figure 2:
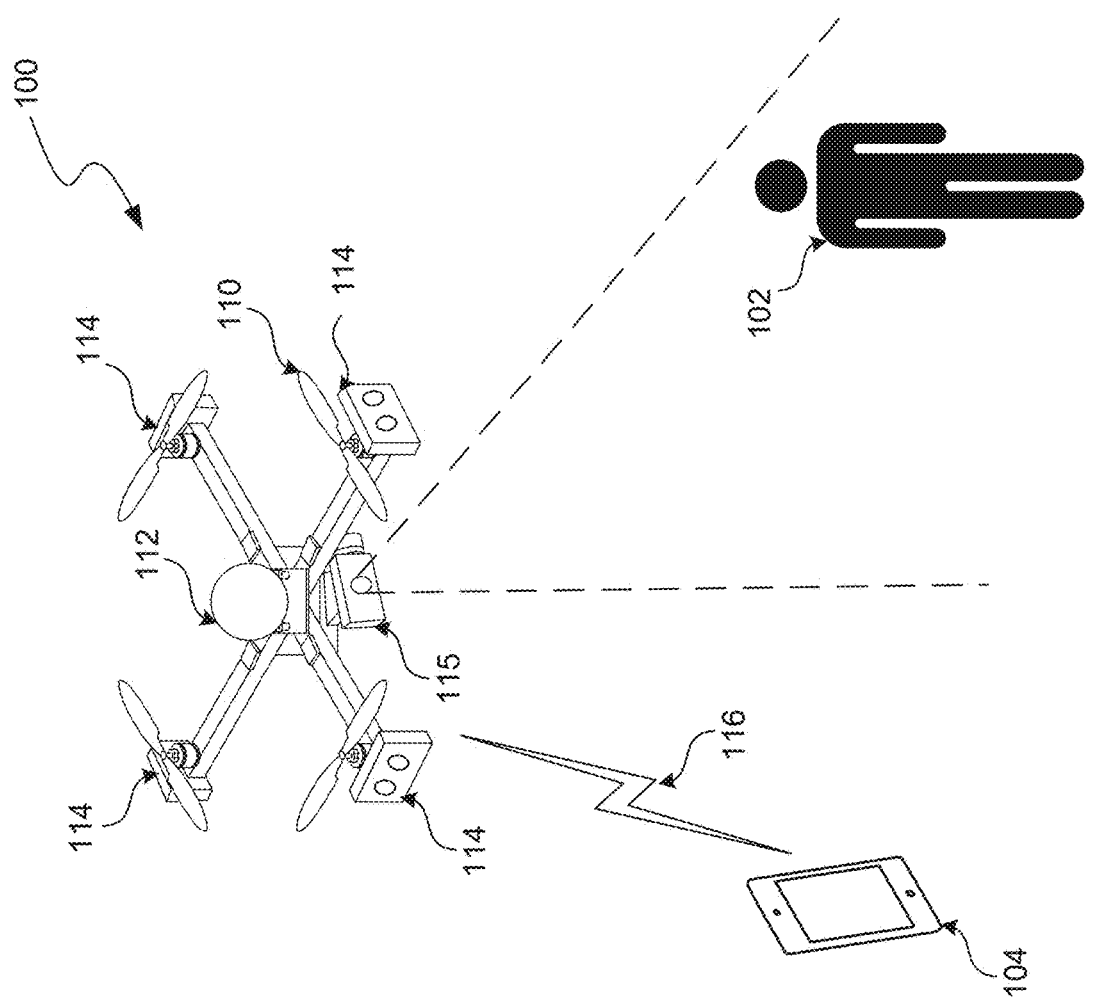
FIG. 2 shows an example configuration of an autonomous vehicle in the form of an unmanned aerial vehicle (UAV) within which certain techniques described herein may be applied.

In certain embodiments, the techniques described herein for image space motion planning can be applied to, as part of or in conjunction with, a visual navigation system configured to guide an autonomous vehicle such as a UAV. FIG. 2 shows an example configuration of a UAV 100 within which certain techniques described herein may be applied. As shown in FIG. 2, UAV 100 may be configured as a rotor-based aircraft (e.g., a "quadcopter"). The example UAV 100 includes propulsion and control actuators 110 (e.g., powered rotors or aerodynamic control surfaces) for maintaining controlled flight, various sensors for automated navigation and flight control 112, and one or more image capture devices 114a-c and 115c for capturing images (including video) of the surrounding physical environment while in flight. Although not shown in FIG. 2, UAV 100 may also include other sensors (e.g., for capturing audio) and means for communicating with other devices (e.g., a mobile device 104) via a wireless communication channel 116.

In the example depicted in FIG. 2, the image capture devices are depicted capturing an object 102 in the physical environment that happens to be a human subject. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in autonomous flight, UAV 100 can also capture images using any one or more image capture devices that can be displayed in real time and or recorded for later display at other devices (e.g., mobile device 104).

FIG. 2C shows an example configuration of a UAV 100 with multiple image capture devices configured for different purposes. As shown in FIG. 2C, in an example configuration, a UAV 100 may include one or more image capture devices 114 that are configured to capture images for use by a visual navigation system in guiding autonomous flight by the UAV 100. Specifically, the example configuration of UAV 100 depicted in FIG. 2 includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 2 also includes another image capture device 115 configured to capture images that are to be displayed but not necessarily used for navigation. In some embodiments, the image capture device 115 may be similar to the image capture devices 114 except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation, lower resolution images may be preferable in certain contexts to reduce processing load and provide more robust motion planning capabilities. Accordingly, the image capture device 115 may be configured to capture higher resolution images than the image capture devices 114 used for navigation.

The image capture device 115 can be configured to track a subject 102 in the physical environment for filming. For example, the image capture device 115 may be coupled to a UAV 100 via a subject tracking system such as a gimbal mechanism, thereby enabling one or more degrees of freedom of motion relative to a body of the UAV 100. The subject tracking system may be configured to automatically adjust an orientation of an image capture device 115 so as to track a subject in the physical environment. In some embodiments, a subject tracking system may include a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotate, pan, etc.) the captured images so as to provide the overall effect of three degrees of freedom.

The UAV 100 shown in FIG. 2 is an example provided for illustrative purposes. A UAV 100 in accordance with the present teachings may include more or fewer components than as shown. The example UAV 100 depicted in FIG. 2 may include one or more of the components of the example system 1600 described with respect to FIG. 16. For example, the aforementioned visual navigation system may include or be part of the processing system described with respect to FIG. 16. While the techniques for image space motion planning can be applied to aid in the guidance of an autonomous UAV similar to the UAV 100 depicted in FIG. 2, such techniques are not limited to this context. The described techniques may similarly be applied to assist in the autonomous navigation of other vehicles such as fixed-wing aircraft, automobiles, or watercraft.

Image Space Motion Planning

The example process 300 begins at step 302 with receiving an image of a physical environment captured by an image capture device coupled to an autonomous vehicle. In some embodiments, the images received at step 302 are captured by an image capture device including one or more cameras, for example, similar to the image capture devices 114 and 115 associated with UAV 100. In some embodiments, the processing system performing the described process may be remote from the image capture device capturing the images. Accordingly, in some embodiments, the images may be received via a computer network, for example, a wireless computer network.

Use of the term "image" in this context may broadly refer to a single still image or to multiple images. For example, the received "image" may refer to captured video including multiple still frames taken over a period of time. Similarly, an "image" may in some cases include a set of multiple images taken by multiple cameras with overlapping fields of view. For example, the "image" received at step 302 may include a stereo pair of images taken by two adjacent cameras included in a stereoscopic image capture device such as the image capture device 114 shown in FIG. 2. As another example, the "image" received at step 302 may include multiple images from an array of stereoscopic image capture devices (e.g., the array of image capture device 114 depicted in FIG. 2) that provide up to a full 360 view around the autonomous vehicle. For example, as described with respect to FIG. 9, a received image that includes a view around the autonomous vehicle may reside in an image space that is along a spherical plane surrounding the autonomous vehicle.

Process 300 continues at step 304 with processing the received image to identify one or more regions in the image associated with a particular property. As will be explained in more detail, the "particular property" in this context may refer to some property that is indicative of or assumed to correspond with a particular level of risk or cost associated with travel by the autonomous vehicle into an area of the physical environment that corresponds to pixels residing in the region of the image. For example, the identified region may include stereo depth estimates below a threshold level of confidence (i.e., invalid estimates). Alternatively, the identified region may include pixels corresponding to a physical object such as a tree that has a complex shape which presents a higher risk of collision. Processing of the image at step 304 may involve application of one or more digital image processing techniques including computer vision techniques such as stereoscopic computer vision, object recognition, object pose estimation, object motion estimation, event detection, etc.

Figure 4:
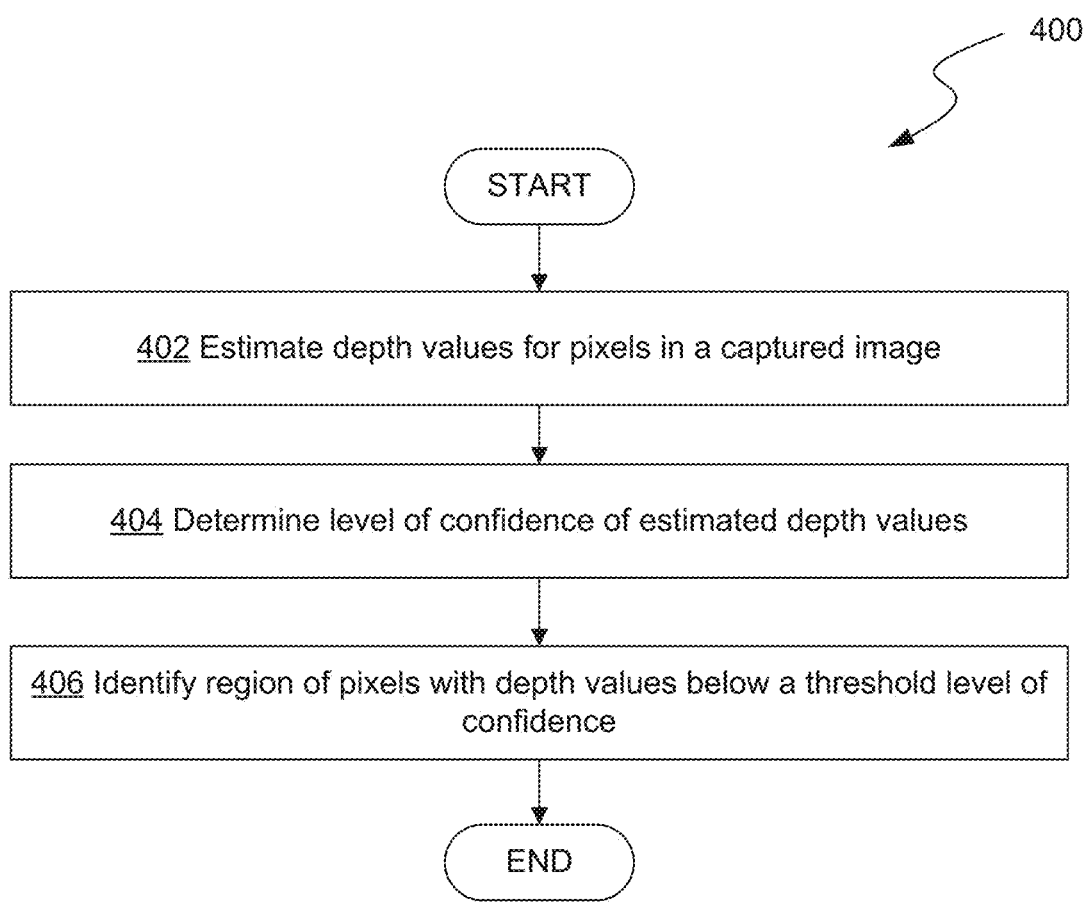
FIG. 4 shows a flow chart of an example process for identifying a region of an image associated with invalid depth estimates.
Figure 5:
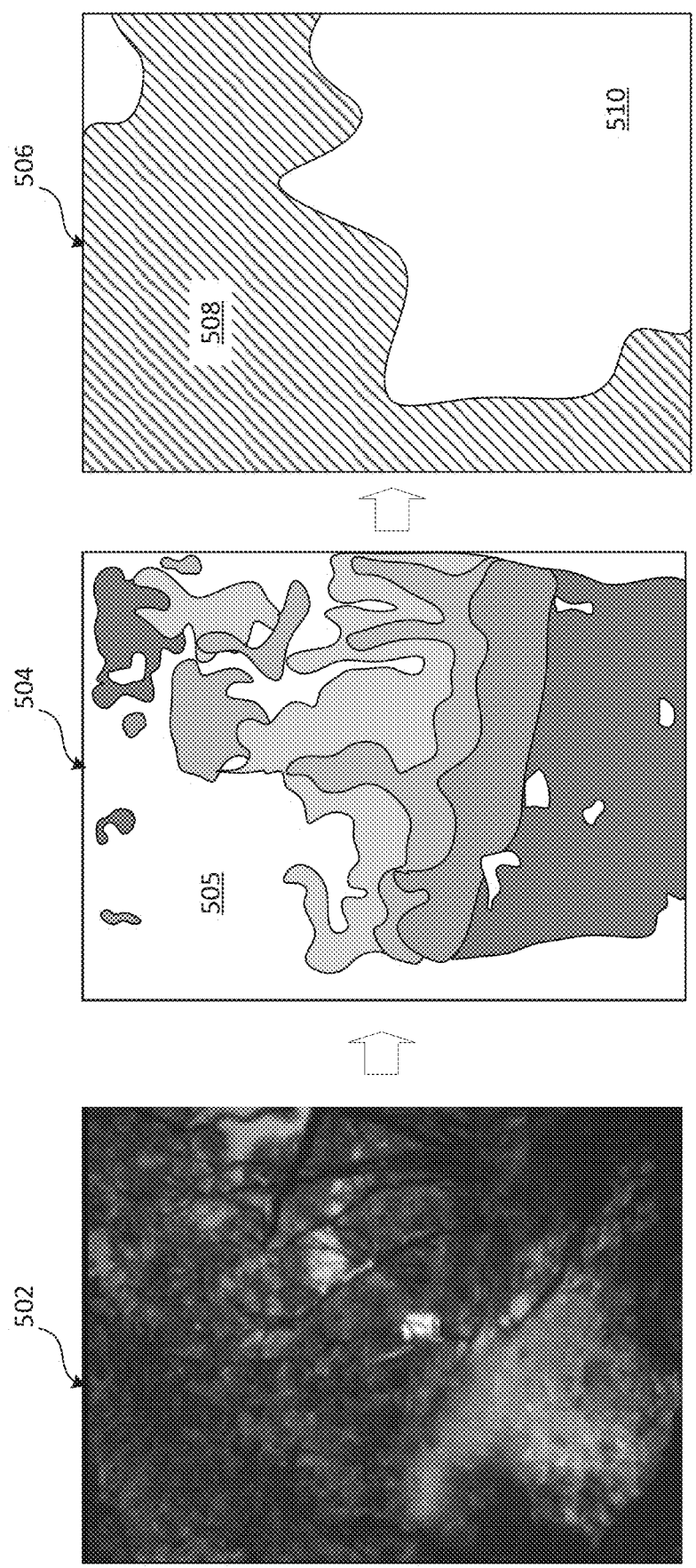
FIG. 5 shows a sequence of images illustrating the example process of the flow chart in FIG. 4.

FIGS. 4-5 describe an example process for identifying a region in the received image that includes depth estimates below a threshold level of confidence. Specifically, FIG. 4 is a flow chart of an example process 400 for image space motion planning of an autonomous vehicle. The example process 400 is described with respect to the sequence of images shown in FIG. 5. One or more steps of the example process 400 may be performed by any one or more of the components of the example processing systems described with respect to FIG. 16 or 17. For example, the process depicted in FIG. 4 may be represented in instructions stored in memory that are then executed by a processing unit. The process 400 described with respect to FIG. 4 is an example provided for illustrative purposes and is not to be construed as limiting. Other processes may include more or fewer steps than depicted while remaining within the scope of the present disclosure. Further, the steps depicted in example process 400 may be performed in a different order than is shown.

Process 400 begins at step 402 with processing a received image 502 to estimate depth values for pixels in the image 502. Depth estimates based on received images can be used for various purposes. For example, in some embodiments, depth estimates can be used to generate a 3D model of the surrounding physical environment. Further, by tracking a position and/or orientation relative to the 3D model, 3D paths can be planned that navigate the physical environment while avoiding obstacles. In this example process, depth estimates are utilized to identify regions of low confidence for the purpose of image space motion planning of an autonomous vehicle.

In an embodiment, the image being processed in this example may include a stereo pair of images taken at the same time and/or a sequence of images with overlapping FOV taken at different times from different positions. Computer vision processes are applied to the received image to search for dense correspondence between the multiple images. The dense correspondences are then used to estimate a depth or distance to a physical object in the physical environment represented by pixels in the image. In some embodiments, this process may be performed for each of the pixels in the received image.

A dense depth map 504 depicted in FIG. 5 visually describes the result of this depth estimation. As shown in FIG. 5, the dense depth map 504 reproduces the spatial layout of the scene depicted in image 502 but includes a visual representation of an estimated depth value for each pixel. For example, the depth values may be thresholded and visually represented as one of multiple colors, shades, etc. For example, the depth map 504 depicted in FIG. 5 includes several regions of varying shades. Each region of a particular shade may represent a particular range of estimated depth values. A person having ordinary skill will recognize that the depth map 504 is included to illustrate the depth estimation step but that the techniques described herein do not necessarily require generation of such a depth estimate map.

Notably, in many situations, it may be difficult to produce accurate depth estimations in certain regions of a given image. This is visually illustrated in the example depth map 504 by the blank region 505. Accurate depth estimates may be difficult to attain for a number of reasons such as poor lighting conditions, physical objects with complex shapes, physical objects with uniform textures, issues with the image capture device, etc. For example, the image 502 shown in FIG. 5 is taken by a UAV following a human subject along a pathway lined by trees. Some of the trees along the pathway include many small and complex shapes in the form of branches and foliage. These complex shapes can lead to invalid depth estimates, particularly where the image capture device is in motion.

Accordingly, process 400 continues at step 404 with determining a level of confidence in the estimated depth values. Confidence levels may be determined a number of different ways. For example, an estimated depth for a given pixel or set of pixels may be compared to other pixels (e.g., adjacent pixels or pixels corresponding to the same physical object), to past estimated depth values for the same pixel or set of pixels (e.g., over the 10 seconds), to measurements from other sensors (e.g., range sensors such as laser illuminated detection and ranging (LIDAR)), or any other method that may indicate a level of confidence in the estimated value. The level of confidence may be represented several different ways. For example, the level of confidence may fall within one of several categories (e.g., high, medium, low, etc.) or may be represented numerically, for example, as value on a defined scale. For example, confidence may be ranked on a scale of 0 to 1, with 0.0 to 0.4 indicating low confidence, 0.5 to 0.8 indicating medium confidence, and 0.9 to 1.0 indicating high confidence.

Process 400 continues at step 406 with identifying a region of the image that includes estimated depth values below a threshold level of confidence. The threshold level of confidence may differ and will depend on the characteristics and requirements of the implementation. The threshold level of confidence may be static, user-configurable, variable based on conditions (visibility, speed of the vehicle, location, etc.), and/or may be learned through the use of trained or untrained machine learning. In some embodiments, the identified region may directly correspond, for example, to the region 505 depicted in the depth map 504 that includes invalid estimates. Alternatively, in some embodiments, the overall spatial relationship of the pixels having depth estimates below the threshold level of confidence may be analyzed to produce a "smoother" region that encompasses areas of the image with relatively high numbers of depth estimates below a threshold level of confidence. For example, the region 505 including all the interspersed invalid depth estimates in the depth map 504 may be analyzed to produce a region map 506. For example, the region map 506 depicted in FIG. 5 includes a region 508 that is indicative of areas of the image 502 with invalid or lower confidence depth estimates and region 510 which is indicative of areas of the image 502 with higher confidence depth estimates. Stated otherwise, the region 508 includes or tends to include pixels associated with depth estimates below a threshold level of confidence.

The manner in which the depth estimates are analyzed across an area of the image 502 to produce the region map 506 will differ depending on the characteristics and requirements of the implementation. The region map 506 shown in FIG. 5 is an example provided for illustrative purposes and is not to be construed as limiting. For example, the region map 506 shown in FIG. 5 is binary including only a valid region 510 and an invalid region 508. In other embodiments, the calculated confidence levels may be thresholded to produce a gradient region map with multiple identified regions, each indicative of a particular range of confidence levels.

Figure 6:
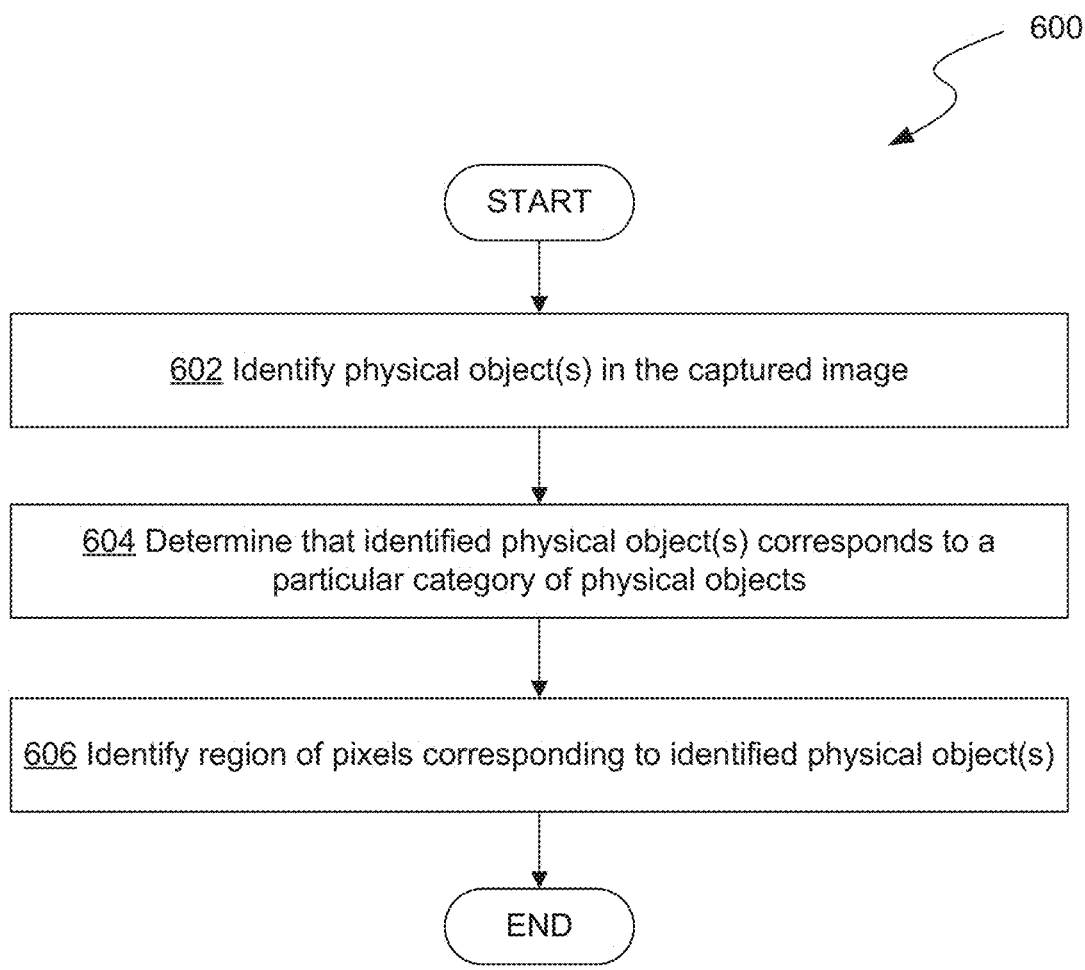
FIG. 6 shows a flow chart of an example process for identifying a region of an image associated with a particular physical object.
Figure 7:
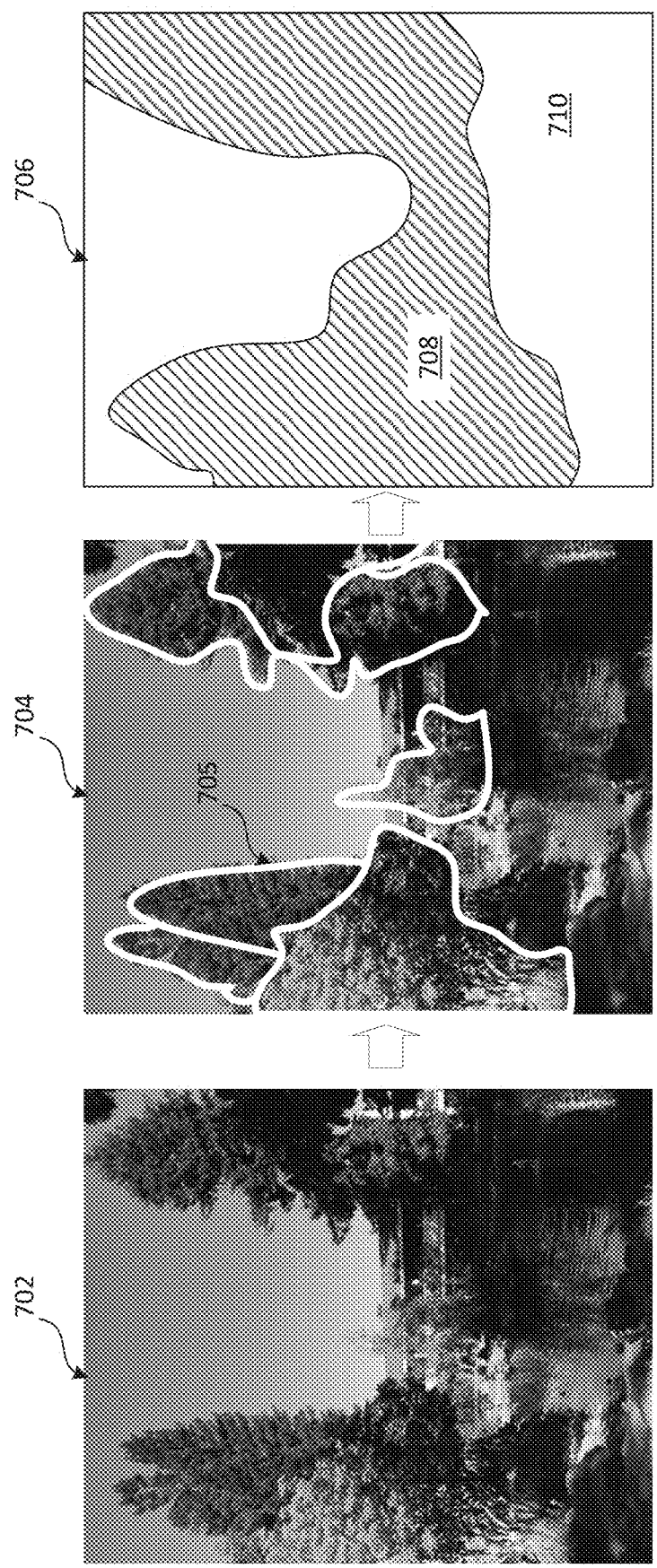
FIG. 7 shows a sequence of images illustrating the example process of the flow chart in FIG. 6.

FIGS. 6-7 describe an example process for identifying a region in the received image that includes pixels corresponding to certain physical objects. Specifically, FIG. 6 is a flow chart of an example process 600 for image space motion planning of an autonomous vehicle. The example process 600 is described with respect to the sequence of images shown in FIG. 7. One or more steps of the example process 600 may be performed by any one or more of the components of the example processing systems described with respect to FIG. 16 or 17. For example, the process depicted in FIG. 6 may be represented in instructions stored in memory that are then executed by a processing unit. The process 600 described with respect to FIG. 6 is an example provided for illustrative purposes and is not to be construed as limiting. Other processes may include more or fewer steps than depicted while remaining within the scope of the present disclosure. Further, the steps depicted in example process 600 may be performed in a different order than is shown.

Process 600 begins at step 602 with processing the received image 705 to recognize or identify one or more physical objects depicted in the image and continues at step 604 with determining that the one or more physical objects as corresponding to a particular category or class of physical objects. For example, image 704 visually illustrates the identification of several objects in the scene of image 702 that are generally categorized as trees or plants as indicated by outline 705. The process of identifying and classifying identified objects can be performed by comparing the captured images of such objects to stored two-dimensional (2D) and/or 3D appearance models. For example, through computer vision, an object may be identified as a tree. In some embodiments the 2D and/or 3D appearance models may be represented as a trained neural network that utilizes deep learning to classify objects in images according to detected patterns. Through a semantic segmentation process, pixels in the received image 702 are labeled as corresponding to one or more of the identified physical objects. For example, pixels can be labeled as corresponding to trees, vehicles, people, etc.

The example process 600 continues at step 606 with identifying regions of the image that include pixels corresponding to particular identified physical objects. In an autonomous navigation context this step may specifically include identifying regions of the image that include identified objects that present a risk to an autonomous vehicle. For example, as previously mentioned, objects with complex shapes such as trees and/or objects that tend to move unpredictably such as vehicles, people, animals, etc. can be difficult to navigate around. Accordingly, step 606 may involve identifying regions of the image that include pixels corresponding to objects that fall into these categories.

In some embodiments, the identified region(s) may directly correspond, for example, to the identified objects. For example, the identified region(s) of the image may include pixels falling within the outlined region 705 as shown in FIG. 7. Alternatively, in some embodiments, the overall spatial relationship of the pixels corresponding to identified objects may be analyzed to produce a "smoother" region. For example, FIG. 7 shows a region map 706 that includes a region 708 that includes pixels corresponding to a particular category of physical object and a region 710 that does not include such pixels. The actual shape of region 708 at any given time may depend on a number of factors such as distance to identified objects, motion of identified objects, type of identified objects, etc. For example, an identified region of risk associated with a person in motion may extend beyond the outline of the person in a direction of the person's current motion.

The manner in which pixels are analyzed across an area of the image 702 to produce the region map 706 will differ depending on the characteristics and requirements of the implementation. The region map 706 shown in FIG. 7 is an example provided for illustrative purposes and is not to be construed as limiting. For example, the region map 706 shown in FIG. 5 is binary, including only a valid region 710 and an invalid region 708. In other embodiments, multiple regions may be included for category of identified object depicted in the image. Further, each region may be indicative of a different level of risk based on the type of object, motion of object, distance to object, etc.

As previously alluded to, and as will be described in more detail, in some embodiments, costs are associated with the identified regions for the purposes of optimizing a motion plan. The cost value assigned to an identified region may be indicative of a level of risk associated with travel through a 3D portion of the physical environment corresponding to the identified region of the received image. In some embodiments, a "region" map (e.g., region map 506 or 706) may also be referred to herein as a "cost function" map. For example, the regions 508 and 708 of cost function maps 506 and 706 (respectively) would be associated with a high cost while the regions 510 and 710 would be associated with a low cost. Again, in other embodiments, the cost map may include more than two regions with each region associated with a particular range of cost.

The costs attributed to certain regions can, in some embodiments be learned through a machine learning process. The learned costs provide a measure of danger or undesirability for moving in a certain direction, and may incorporate implicit or explicit notions of depth estimation, structure prediction, time to collision, and general semantic understanding. Some formulations may also learn a notion of uncertainty. A sequence of multiple images can be used to learn implicit temporal cues, such as optical flow. Data to train such a system might come from acausal estimation of the scene geometry, such as from a voxel map or mesh reconstruction, or evaluation of executed paths against the objectives used to compute them.

The above described techniques for identifying regions in a captured image are examples provided for illustrative purposes and are not to be construed as limiting. Other embodiments may identify regions having other properties such as low lighting, low contrast, high motion, etc., that may also be indicative of a level of risk or undesirability in moving in a certain direction.

Figure 3:
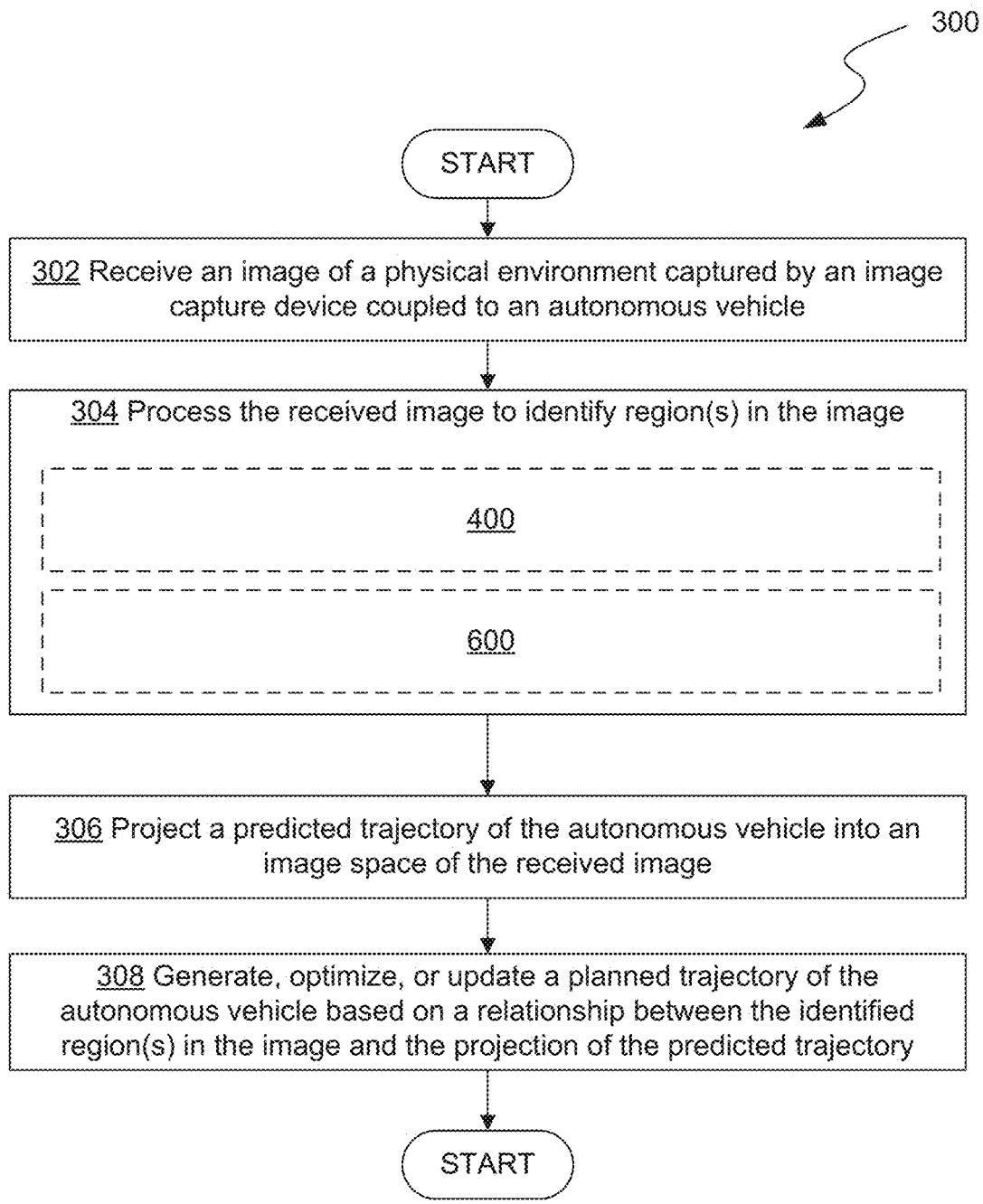
FIG. 3 shows a flow chart of an example process for image space motion planning of an autonomous vehicle.
Figure 8B:
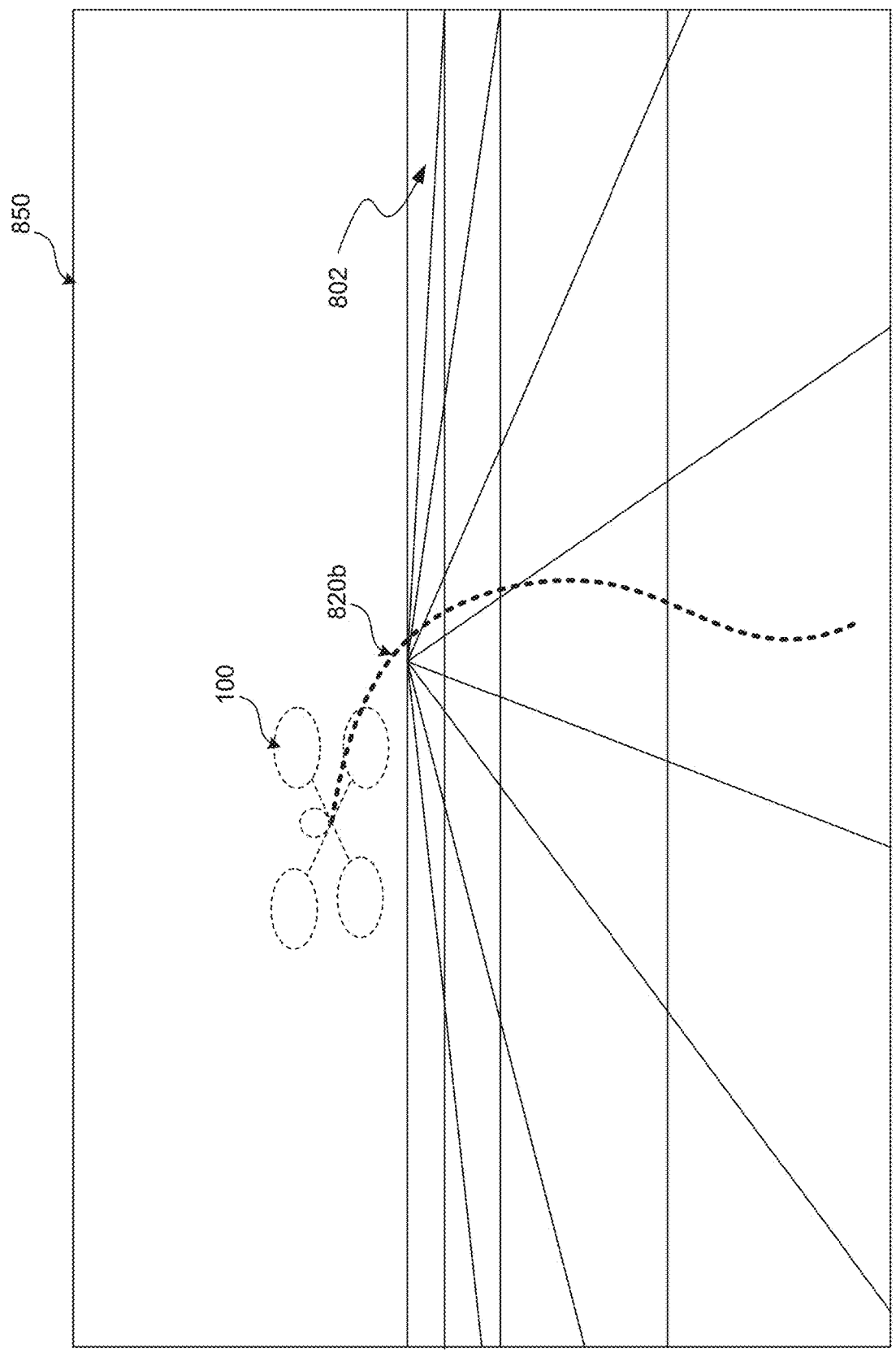
FIG. 8B shows an example representation of a projection of the 3D trajectory of FIG. 8A in an image space of a camera coupled to the UAV.

Returning to FIG. 3, process 300 continues at step 306 with projecting a predicted trajectory of the autonomous vehicle into an image space of the received image. FIG. 8A shows an example representation of a UAV 100 in flight through a physical environment 802. As shown in FIG. 8A, the UAV 100 is inflight along a predicted 3D trajectory 820 from a current position to a predicted future position (as indicated by the dotted line UAV 100). While in flight, the UAV 100 is capturing images of the physical environment 802 as indicated by the FOV dotted line 810. Assuming that an image is captured facing along the predicted trajectory, that predicted 3D trajectory can be projected into a 2D image space of the captured image. For example, FIG. 8B shows an example representation of an image plane 850 of an image captured by the UAV 100 in flight through the physical environment 802. The image plane 850 shown in FIG. 8B is based on the FOV of the UAV 100 indicated by dotted lines 810 in FIG. 8A. As shown in FIG. 8B, the 3D predicted trajectory 820a has been projected into the 2D image plane 805 as projected trajectory 820b.

The predicted 3D trajectory 820a of UAV 100 depicted in FIG. 8A may be based on a current estimated position, orientation, and motion of the UAV 100. For example, given current velocity/acceleration vectors of a UAV 100 (e.g., measured by an IMU), a predicted 3D trajectory can be calculated. Alternatively, or in addition, the predicted 3D trajectory may represent a planned 3D trajectory (i.e., flight path). A planned 3D trajectory may be generated by an autonomous navigation system associated with the UAV 100. In an embodiment, this planned 3D trajectory may be based only on the image space motion planning techniques described herein. In other words, a planned 3D trajectory may be continually generated and updated based on the image space analysis techniques described herein as the UAV 100 flies through the physical environment 802.

In other embodiments, image space motion planning techniques described herein may optimize, update, or otherwise supplement a planned 3D trajectory generated based on one or more other localization/navigation systems. For example, several systems and methods for estimating a position and/or orientation of an autonomous vehicle in a physical environment and by guiding autonomous flight based on those estimations are described below in the section titled "Example Localization Systems." As an illustrative example, a panned 3D trajectory 802a may be generated by a navigation system of the UAV 100 based on estimated position and/or orientation of the UAV 100 within a generated 3D model of the physical environment 802. The generated 3D model may comprise a 3D occupancy map including multiple voxels, each voxel corresponding to an area in the physical environment that is at least partially occupied by physical objects. The 3D occupancy map through which the path of the UAV 100 is planned may be generated in real-time or near real-time as the UAV 100 flies through the physical environment 802 based on data received from one or more sensors such as image captured devices, range finding sensors (e.g., LIDAR), etc.

Returning to FIG. 3, example process 300 continues at step 308 with generating, optimizing, or updating a planned 3D trajectory of an autonomous vehicle through the physical environment based on a spatial relationship between the region(s) identified at step 304 and the projection of the predicted/planned 3D trajectory from step 306.

Figure 9:
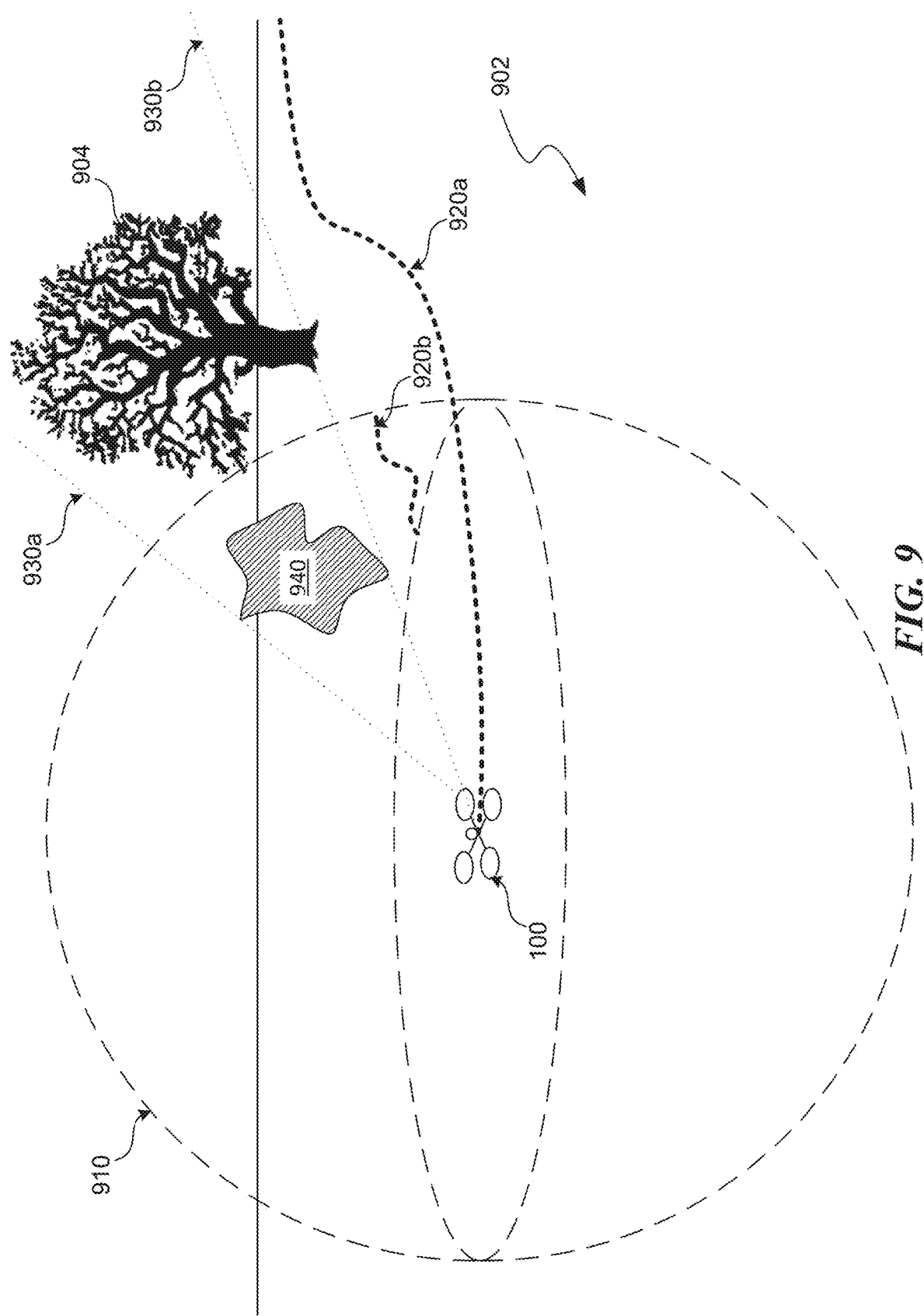
FIG. 9 shows a representation of a spherical image space surrounding a UAV.

Consider the example scenario illustrated in FIG. 9 which depicted a UAV 100 in flight through a physical environment 902 that includes a physical object in the form of a tree 904. The UAV 100 depicted in this example includes an array of image capture devices capturing up to a full 360 degrees around the UAV 100. In this example, the image space of the image or set of images captured by the UAV 100 is represented as a spherical plane 910 surrounding the UAV 100. In this context, a pixel in an image captured by an image capture device coupled to the UAV 100 can be conceptualized as corresponding to a ray originating at the image captured device and extending to a point in the physical environment 902 corresponding to the pixel. Accordingly, an area of pixels associated with an identified region of the image can be conceptualized as a set of rays bounding a volume of space in the physical environment 902 into which flight by the UAV 100 may be risky or otherwise undesirable.

In FIG. 9, this area of pixels is represented by the example region 940 residing in the image space 910. In this example, region 940 results from image capture of tree 904 in the physical environment 902. As previously discussed, this region 940 may have been identified based on invalid depth estimates due to the complex shape of the tree 904. Alternatively, or in addition, the region 940 may have been identified based on the identification in a captured image of physical object 904 as a tree. In any case, the region 920 residing in the image space 910 can be conceptualized as a set of rays bounding a volume of space as represented by dotted lines 930a and 930b.

Accordingly, step 308 of example process 300 can be conceptualized as generating, optimizing, or updating a planned 3D trajectory 920a of the UAV 100 based on a spatial relationship between the projection 920b (of the planned trajectory 920a) and the identified region 940 within the image space 910. In an embodiment, the UAV 100 may be prevented from entering the volume of space corresponding to the identified region 940 by flying along a trajectory that does not project into (i.e., overlap) the identified region 940.

Figure 10:
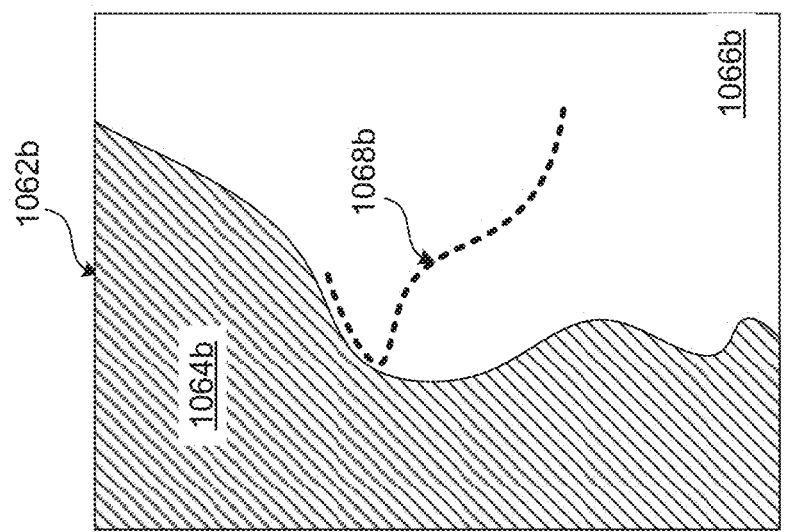
FIG. 10 shows a sequence of region maps that illustrate an example image space motion planning response.
Figure 10:
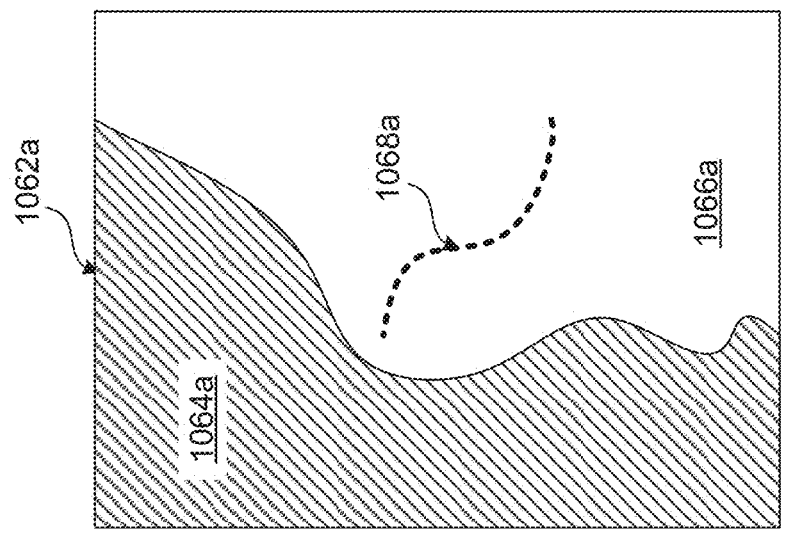

FIG. 10 illustrates an example image space motion planning response that is configured to avoid overlap between an identified region and a projection of a predicted 3D trajectory. Specifically, FIG. 10 shows a sequence of region maps (i.e., cost function maps) 1062a and 1062b corresponding to images captured by an autonomous vehicle (e.g., UAV 100) in flight through a physical environment. In this example, region map 1062a is based on an image captured at an initial (i.e., current) time step, and region map 1062b is based on an image captured at a subsequent time step. Region map 1062a includes an initial (i.e., current) instance of an identified region 1064a, an initial (i.e., current) instance of region 1066a, and an initial (i.e., current) instance of a projection 1068a of a planned 3D trajectory of the autonomous vehicle. Similarly, region map 1062b includes a subsequent instance of an identified region 1064b, a subsequent instance of region 1066b, and a subsequent instance of the projection 1068b of a planned 3D trajectory of the autonomous vehicle. In this example, the identified region 1064a-b is based on invalid depth estimates and/or identified objects (e.g., trees), for example, as described with respect to FIGS. 4-7. As such, the identified region 1064a-b may be associated with a higher cost value than region 1066a-b.

In the illustrated response, a planned 3D trajectory is generated or updated such that the projection 1068a-b of the planned 3D trajectory avoids contact or overlap with the identified "high cost" region 1064a-b. For example, as shown in FIG. 10, the planned 3D trajectory that is represented by the initial projection 1068a is updated to turn away from the area in the physical environment corresponding to identified region 1064a, thereby resulting in the subsequent projection 1068b. For clarity, only two time steps are shown in FIG. 10; however, a person having ordinary skill will recognize that planned motion of the autonomous vehicle through a physical environment may be continually updated (at regular or irregular intervals) based on this image space analysis as the autonomous vehicle moves through the physical environment.

The costs values associated with the regions 1064a-b and 1066a-b may be factored into a motion planning process by an autonomous navigation system along with one or more other motion planning objectives. In other words, the image space motion planning objective to avoid contact or overlap between the identified region 1064a-b and the projection 1068a-b may only represent one objective that is then factored against other motion planning objectives, such as tracking an object in the physical environment, avoiding obstacles (e.g., detected by other means such as proximity sensors), maneuvering constraints (e.g., maximum acceleration), etc. These other motion planning objectives may similarly be associated with cost values. The planned 3D trajectory is accordingly optimized by minimizing the overall cost of the planned 3D trajectory.

The manner in which the costs of various factors (e.g., identified region 1064a) are applied by a navigation system in planning the motion of an autonomous vehicle will depend on the characteristics and requirements of a given implementation. For example, consider a UAV 100 that is configured to prioritize remaining within a maximum separation distance to a human subject being tracked. In such an example, the cost of falling outside of that maximum separation distance might trump any cost associated with flying along a trajectory that would cause the projection of the trajectory to overlap an identified region of pixels with invalid depth estimates. In the context of FIG. 10, the projection 1068b of the second instance of the planned 3D trajectory would instead extend into identified region 1064b, despite the associated cost, so that the UAV 100 remains within a maximum separation distance to a tracked subject. In any given implementation, the manner in which cost values are applied may be static, user-configurable, variable based on conditions (visibility, speed of the vehicle, location, etc.), and/or may be learned through the use of trained or untrained machine learning.

Figure 11:
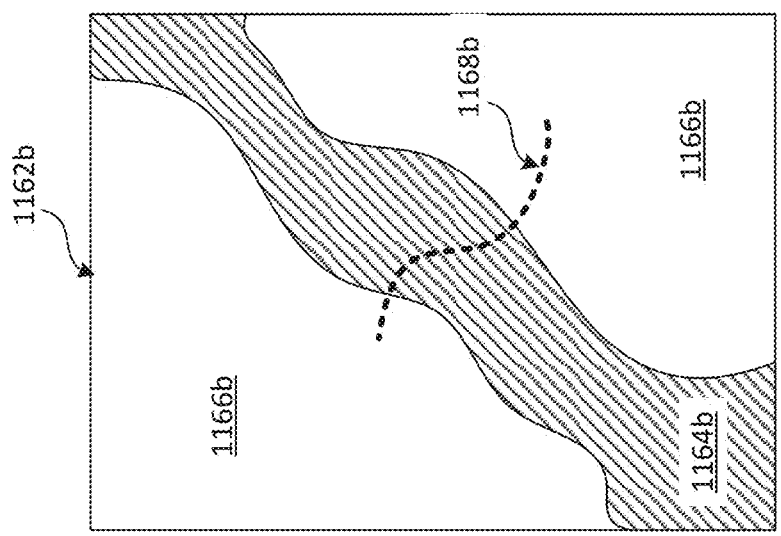
FIG. 11 shows a sequence of region maps that illustrate another example image space motion planning response.
Figure 11:
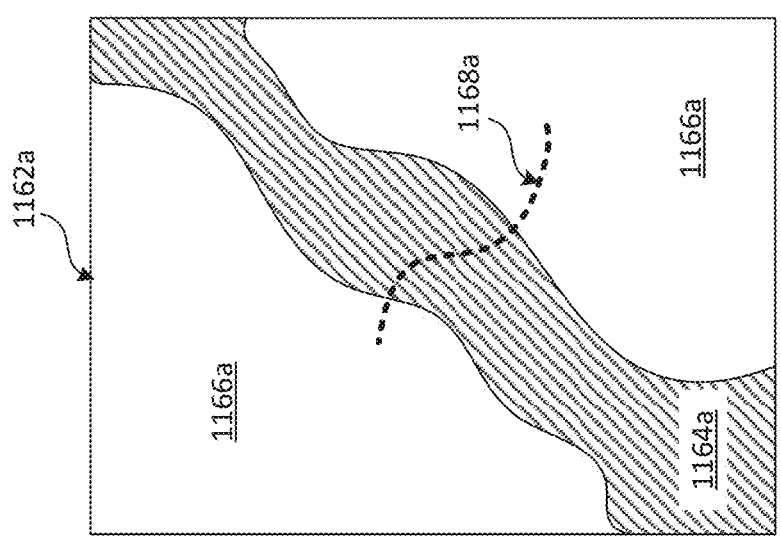

The motion planning response to an identified region of an image can depend on certain characteristics of the identified region such as shape, orientation, position relative to the projection of the predicted/planned 3D trajectory, as well as changes in such characteristics over time. FIG. 11 illustrates an example image space motion planning response that takes into account a relative shape of the identified region. As in FIG. 10, FIG. 11 shows a sequence of region maps (i.e., cost function maps) 1162a and 1162b corresponding to images captured by an autonomous vehicle (e.g., UAV 100) in flight through a physical environment. In this example, region map 1162a is based on an image captured at an initial (i.e., current) time step, and region map 1162b is based on an image captured at a subsequent time step. Region map 1162a includes an initial (i.e., current) instance of an identified region 1164a, an initial (i.e., current) instance of region 1166a, and an initial (i.e., current) instance of a projection 1168a of a planned 3D trajectory of the autonomous vehicle. Similarly region map 1162b includes a subsequent instance of an identified region 1164b, a subsequent instance of region 1166b, and a subsequent instance of the projection 1168b of a planned 3D trajectory of the autonomous vehicle. In this example, the identified region 1164a-b is based on invalid depth estimates and/or identified objects (e.g., trees), for example, as described with respect to FIGS. 4-7. As such, the identified region 1164a-b may be associated with a higher cost value than region 1166a-b.

Note that, in contrast to the motion planning response illustrated in FIG. 10, in FIG. 11, the projection 1168b of the second instance of the predicted/planned trajectory continues across identified region 1164b instead to adjusting to avoid overlap or contact with identified region 1164b. In this example motion planning response, the overall cost associated with flight into an area of the physical environment associated with the identified region 1164b may be relatively low since the identified region 1165b is narrow with a lower cost region 1166b on the opposing side. In other words, the costs associated with abandoning one or more other motion planning objectives (e.g., tracking a subject) may outweigh any costs associated with moving in the direction of the identified region 1164b.

Figure 12:
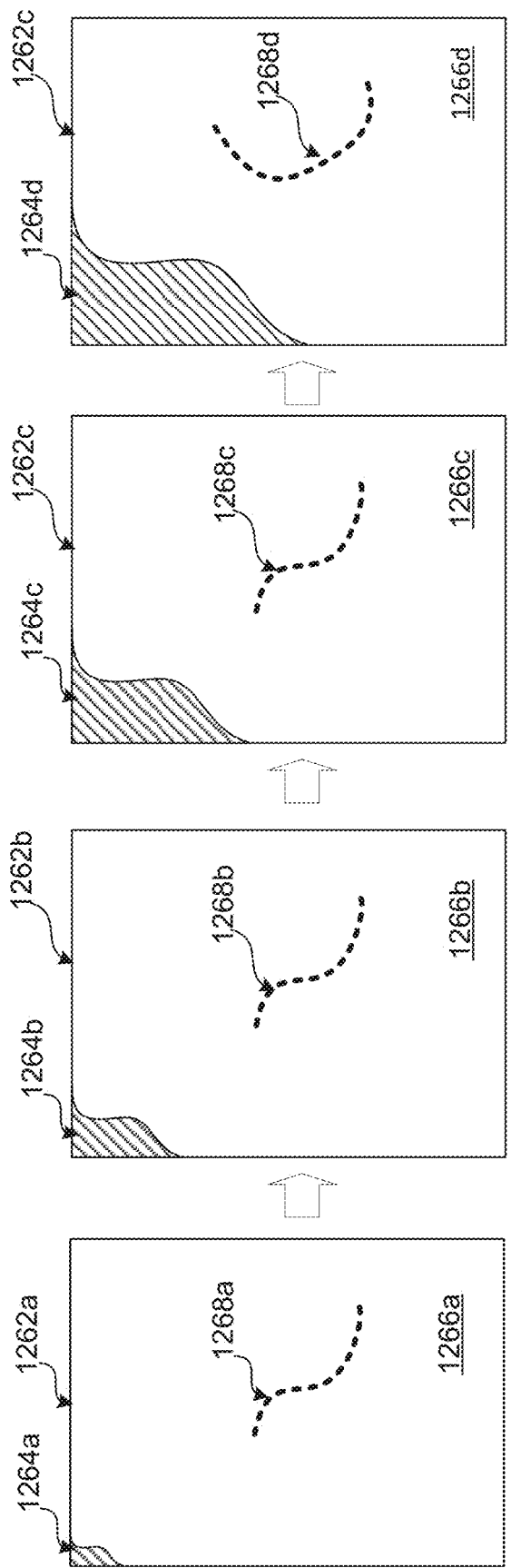
FIG. 12 shows a sequence of region maps that illustrates yet another example image space motion planning response.

The motion planning response to an identified region of an image can also depend on analyzing an optical flow including a sequence of frames over time to determine how the identified region changes over time. FIG. 12 illustrates an example image space motion planning response that takes into account changes in the identified region over time. Specifically, FIG. 12 shows an optical flow including a sequence of region maps (i.e., cost function maps) 1262a-d corresponding to images captured by an autonomous vehicle (e.g., UAV 100) in flight through a physical environment. In this example, region map 1262a is based on an image captured at an initial (i.e., current) time step, and region maps 1162b-d are based on an images captured at subsequent time steps. Region map 1162a includes an initial (i.e., current) instance of an identified region 1264a, an initial (i.e., current) instance of region 1266a, and an initial (i.e., current) instance of a projection 1268a of a planned 3D trajectory of the autonomous vehicle. Similarly, region maps 1162b-d include subsequent instances of an identified region 1264b-d, subsequent instances of region 1266b-d, and subsequent instances of the projection 1268b-d of the planned 3D trajectory of the autonomous vehicle. In this example, the identified region 1264a-d is based on invalid depth estimates and/or identified objects (e.g., trees), for example as described with respect to FIGS. 4-7. As such, the identified region 1264a-b may be associated with a higher cost value than region 1166a-b.

Note that, in contrast to the motion planning response illustrated in FIG. 10, in FIG. 12, the projection 1268d of the fourth instance of the predicted/planned trajectory turns away from the identified region 1264d despite not yet being close to the identified region 1268d. This may be due to an analysis of the overall change in the identified region 1264a-d across a period of time. Specifically, as shown in FIG. 12, as time progresses, the identified region is shown to grow in the upper left corner, perhaps indicating that the autonomous vehicle is moving towards a higher risk area of the physical environment. In such scenario, the cost associated flight along a trajectory pointing towards region 1264a-d may be increased so as to discourage continuing along the trajectory. In optimizing the planned trajectory to minimize cost, the autonomous navigation system may accordingly elect to maneuver the autonomous vehicle in a different direction before getting closer to the area of high risk in the physical environment, for example, as indicated by projection 1268d.

Example Localization Systems

Figure 13:
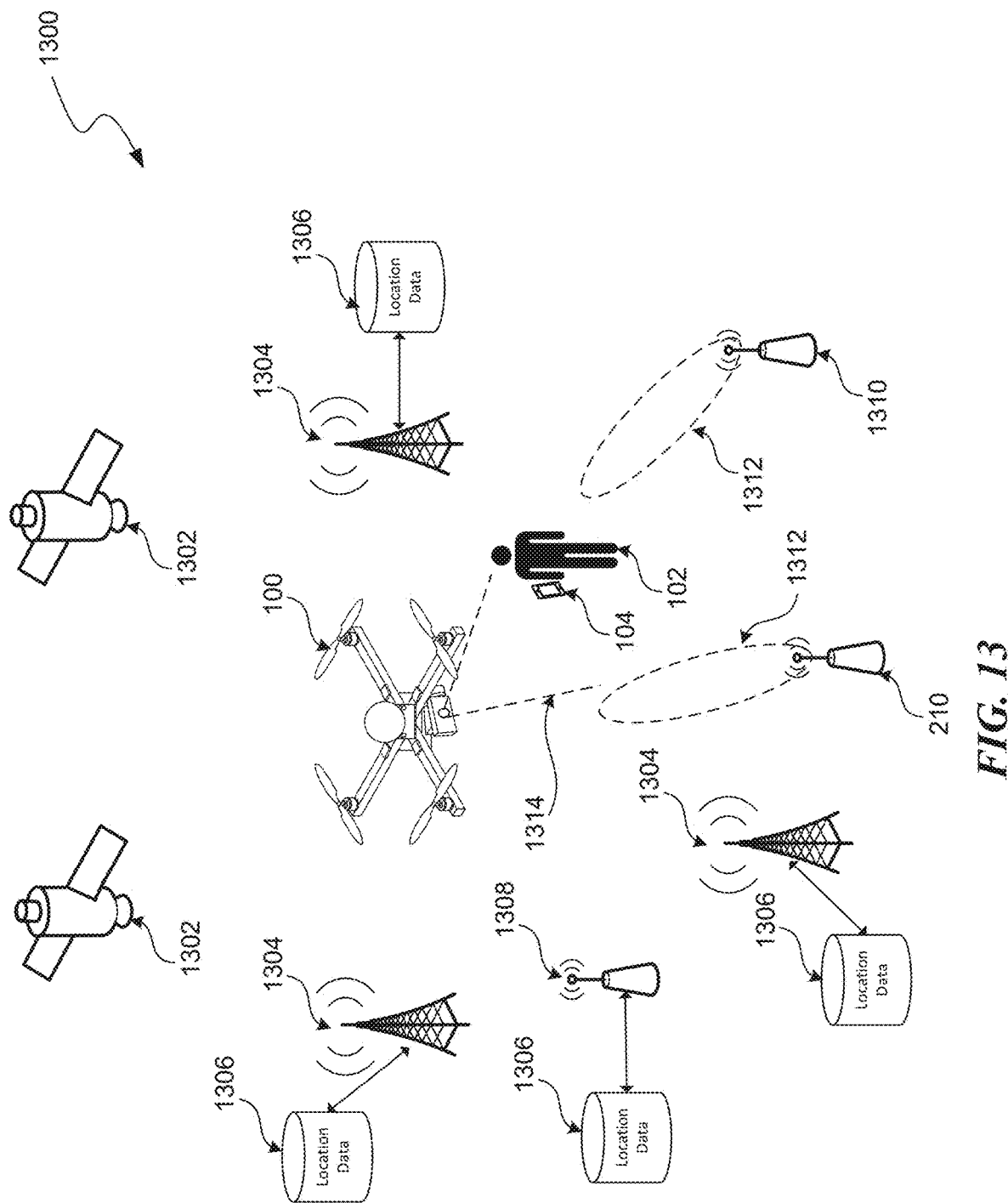
FIG. 13 shows a diagram of an example localization system with which at least some operations described in this disclosure can be implemented.

In addition to image space motion planning, an autonomous navigation system of a vehicle such as UAV 100 may employ any number of other systems and techniques for localization and motion planning. FIG. 13 shows an illustration of a localization system 1300 that may be utilized to guide autonomous navigation of a vehicle such as UAV 100. In some embodiments, the positions and/or orientations of the UAV 100 and various other physical objects in the physical environment can be estimated using any one or more of the subsystems illustrated in FIG. 13. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 13, the example localization system 1300 may include the UAV 100, a global positioning system (GPS) comprising multiple GPS satellites 1302, a cellular system comprising multiple cellular antennae 1304 (with access to sources of localization data 1306), a Wi-Fi system comprising multiple Wi-Fi access points 1308 (with access to sources of localization data 206), and a mobile device 104 operated by a user.

Satellite-based positioning systems such as the GPS (Global Positioning System) can provide effective global position estimates (within a few meters) of any device equipped with a receiver. For example, as shown in FIG. 13, signals received at a UAV 100 from satellites of a GPS system 1302 can be utilized to estimate a global position of the UAV 100. Similarly, positions relative to other devices (e.g., a mobile device 104) can be determined by communicating and comparing the global positions of the other devices.

Localization techniques can also be applied in the context of various communications systems that are configured to transmit signals wirelessly. For example, various localization techniques can be applied to estimate a position of UAV 100 based on signals transmitted between the UAV 100 and any of cellular antennae 1304 of a cellular system or Wi-Fi access points 1308, 1310 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 13 by dotted lines 1312 emanating from WiFi routers 1310.

An inertial measurement unit (IMU) may be used to estimate position and/or orientation of device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on an calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled) as well as other objects in the physical environment. The term, "computer vision" in this context may generally refer to any method of acquiring, processing, analyzing and "understanding" of captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). According to some embodiments, an image capture device of the UAV 100 may include two or more cameras, for example, an array of multiple cameras that provide an unobstructed view around the UAV 100. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Computer vision can be used to identify the presence of an object and identify the object as belonging to a known type with particular dimensions. In such embodiments, an object may be identified by comparing the captured image to stored 2D and/or 3D appearance models. For example, through computer vision, an object may be identified as a tree. In some embodiments, the 2D and/or 3D appearance models may be represented as a trained neural network that utilizes deep learning to classify objects in images according to detected patterns. With this recognition data, as well as other position and/or orientation data for the UAV 100 (e.g., data from GPS, WiFi, Cellular, and/or IMU, as discussed above), UAV 100 may estimate a relative position and/or orientation of the identified object.

Figure 14:
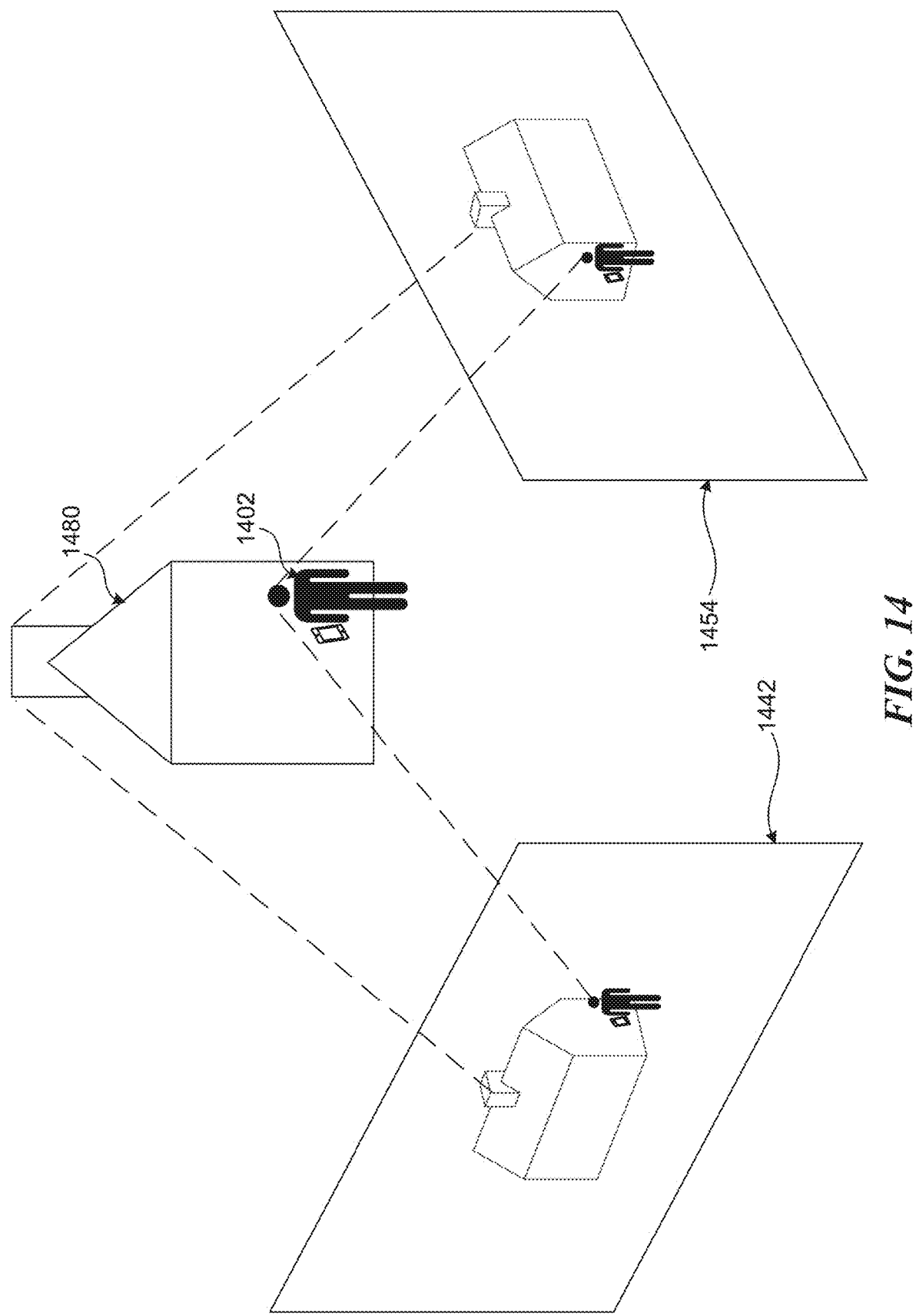
FIG. 14 shows a diagram illustrating the concept of visual odometry based on captured images.

Computer vision can be applied to estimate position and/or orientation using a process referred to as "visual odometry." FIG. 14 illustrates the working concept behind visual odometry at a high level. A plurality of images are captured in sequence as an image capture device moves through space. Due to the movement of the image capture device, the images captured of the surrounding physical environment change from frame to frame. In FIG. 14, this is illustrated by initial image capture field of view 1452 and a subsequent image capture field of view 1454 captured as the image capture device has moved from a first position to a second position over a period of time. In both images, the image capture device may capture real world physical objects, for example, the house 1480 and/or the human subject 1402. Computer vision techniques are applied to the sequence of images to detect and match features of physical objects captured in the field of view of the image capture device. For example, a system employing computer vision may search for correspondences in the pixels of digital images that have overlapping fields of view (FOV). The correspondences may be identified using a number of different methods such as correlation-based and feature-based methods. As shown in, in FIG. 14, features such as the head of a human subject 1402 or the corner of the chimney on the house 1480 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture device over time. Further, these estimates can be used to calibrate various positioning systems, for example, through estimating differences in camera orientation and/or intrinsic parameters (e.g., lens variations) or IMU biases and/or orientation. Visual odometry may be applied at both the UAV 100 and any other computing device such as a mobile device 104 to estimate the position and/or orientation of the UAV 100. Further, by communicating the estimates between the systems (e.g., via a Wi-Fi connection) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard UAV 100 can be processed to generate a 3D map of the surrounding physical environment while estimating the relative positions and/or orientations of the UAV 100 and/or other objects within the physical environment. This is sometimes referred to simultaneous localization and mapping (SLAM). In such embodiments, using computer vision processing, a system in accordance with the present teaching can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 15:
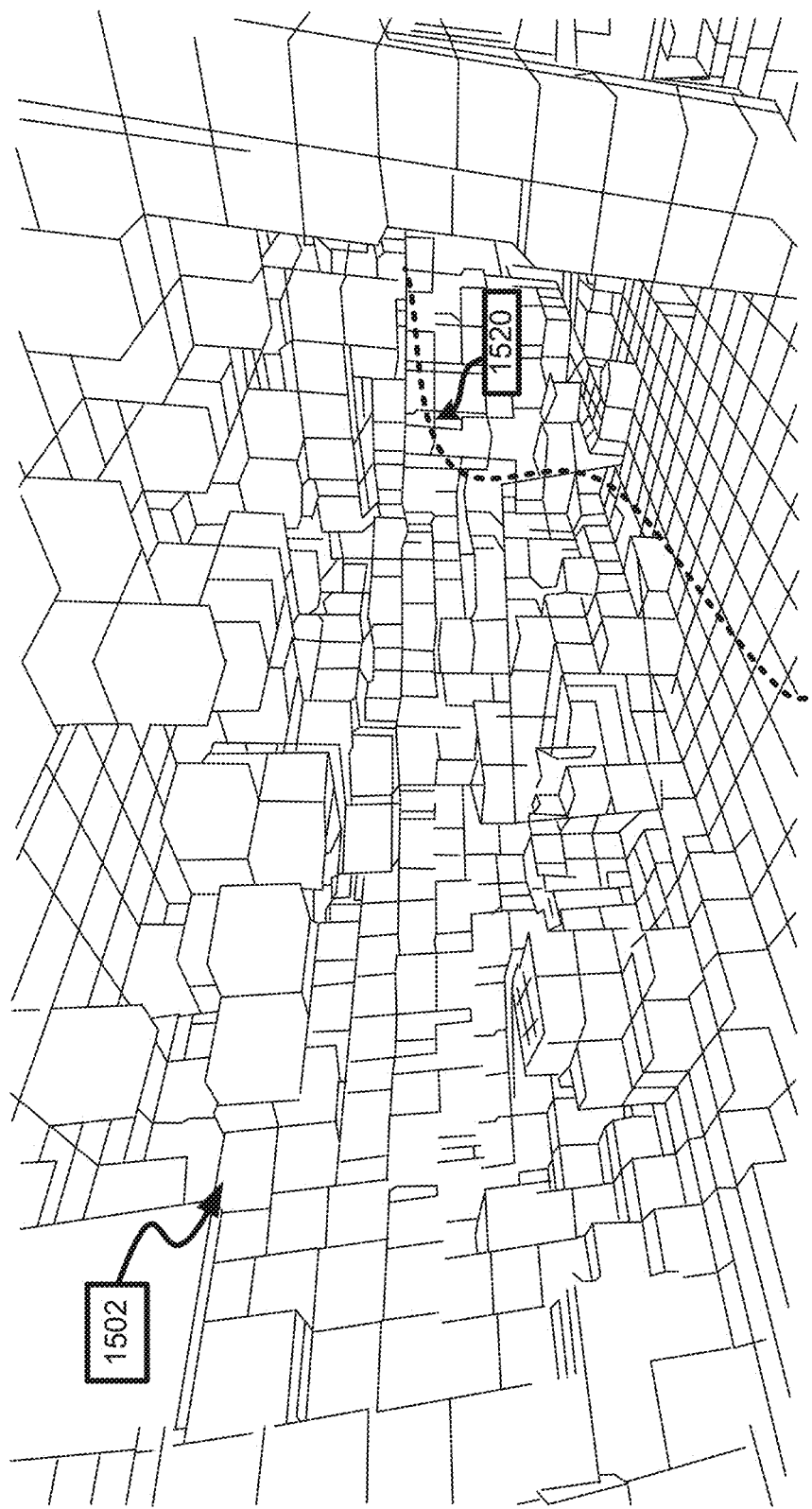
FIG. 15 shows an example view of a 3D occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 15 shows an example view of a 3D occupancy map 1502 of a physical environment including multiple cubical voxels. Each of the voxels in the 3D occupancy map correspond to a space in the physical environment that is at least partially occupied by a physical object. An autonomous navigation system of a UAV 100 can be configured to navigate the physical environment by planning a 3D trajectory 1504 through the 3D occupancy map 1502 that avoids the voxels. In some embodiments, this 3D trajectory 1504 planned using the 3D occupancy map 1502 can be optimized based on the above described techniques for image space motion planning. In such embodiments, the planned 3D trajectory 1504 of the UAV 100 is projected into an image space of captured images for analysis relative to identified high cost regions (e.g., due to invalid depth estimates).

Computer vision may also be applied using sensing technologies other than cameras, such as LIDAR. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a navigation system to plan paths that avoid the obstacles. In addition, in some embodiments, visual navigation processes may incorporate data from proximity sensors (e.g., electromagnetic, acoustic, and/or optics based) to estimate obstacle position with more accuracy. Further refinement may be possible with the use of stereoscopic computer vision with multiple cameras, as described earlier.

The localization system 1300 of FIG. 13 (including all of the associated subsystems as previously described) is only one example of a system configured to estimate positions and/or orientations of an autonomous vehicle and other objects in the physical environment. Localization system 200 may include more or fewer components than shown, may combine two or more components, or a may have a different configuration or arrangement of the components. Some of the various components shown in FIG. 13 may be implemented in hardware, software or a combination of both hardware and software, including one or more signal processing and/or application specific integrated circuits.

Unmanned Aerial Vehicle—Example System

A UAV 100, according to the present teachings, may be implemented as any type of unmanned aerial vehicle. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axis.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on a horizontal plane.

Figure 16:
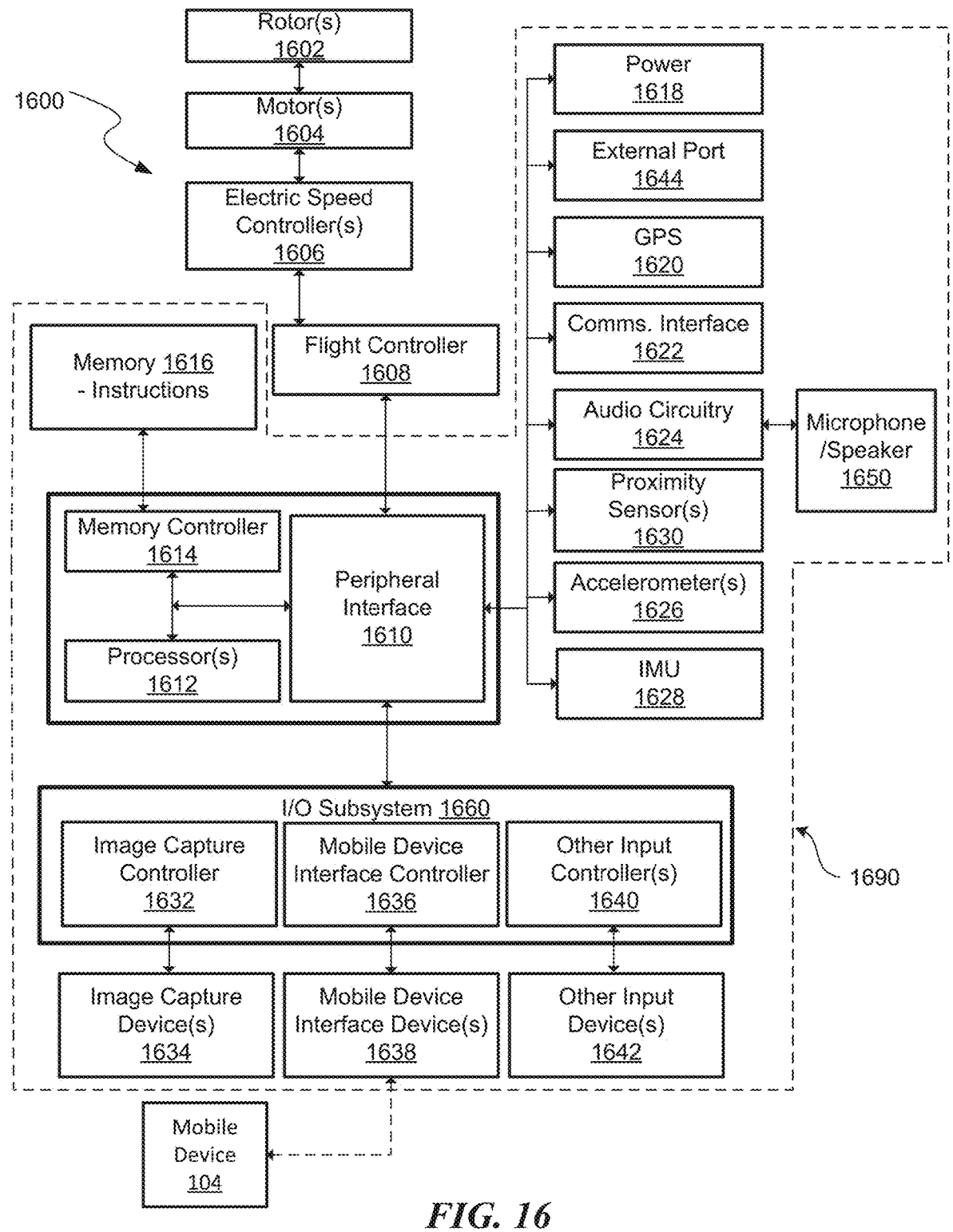
FIG. 16 shows a block diagram of an example UAV system including various functional system components with which at least some operations described in this disclosure can be implemented.

FIG. 16 shows a diagram of an example UAV system 1600 including various functional system components that may be part of a UAV 100, according to some embodiments. UAV system 1600 may include one or more means for propulsion (e.g., rotors 1602 and motor(s) 1604), one or more electronic speed controllers 1606, a flight controller 1608, a peripheral interface 1610, a processor(s) 1612, a memory controller 1614, a memory 1616 (which may include one or more computer readable storage media), a power module 1618, a GPS module 1620, a communications interface 1622, an audio circuitry 1624, an accelerometer 1626 (including subcomponents such as gyroscopes), an inertial measurement unit (IMU) 1628, a proximity sensor 1630, an optical sensor controller 1632 and associated optical sensor(s) 1634, a mobile device interface controller 1636 with associated interface device(s) 1638, and any other input controllers 1640 and input device 1642, for example, display controllers with associated display device(s). These components may communicate over one or more communication buses or signal lines as represented by the arrows in FIG. 16.

UAV system 1600 is only one example of a system that may be part of a UAV 100. A UAV 100 may include more or fewer components than shown in system 1600, may combine two or more components as functional units, or may have a different configuration or arrangement of the components. Some of the various components of system 1600 shown in FIG. 16 may be implemented in hardware, software or a combination of both hardware and software, including one or more signal processing and/or application specific integrated circuits. Also, UAV 100 may include an off-the-shelf UAV (e.g., a currently available remote controlled quadcopter) coupled with a modular add-on device (for example, one including components within outline 1690) to perform the innovative functions described in this disclosure.

As described earlier, the means for propulsion 1602-1604 may comprise a fixed-pitch rotor. The means for propulsion may also be a variable-pitch rotor (for example, using a gimbal mechanism), a variable-pitch jet engine, or any other mode of propulsion having the effect of providing force. The means for propulsion 1602-1604 may include a means for varying the applied thrust, for example, via an electronic speed controller 1606 varying the speed of each fixed-pitch rotor.

Flight Controller 1608 may include a combination of hardware and/or software configured to receive input data (e.g., sensor data from image capture devices 1634), interpret the data and output control commands to the propulsion systems 1602-1606 and/or aerodynamic surfaces (e.g., fixed wing control surfaces) of the UAV 100. Alternatively or in addition, a flight controller 1608 may be configured to receive control commands generated by another component or device (e.g., processors 1612 and/or a separate computing device), interpret those control commands and generate control signals to the propulsion systems 1602-1606 and/or aerodynamic surfaces (e.g., fixed wing control surfaces) of the UAV 100. In some embodiments, the previously mentioned "autonomous" or "visual" navigation system of the UAV 100 may comprise the flight controller 1608 and/or any one or more of the other components of system 1300.

Memory 1616 may include high-speed random access memory and may also include non-volatile memory, such as one or more magnetic disk storage devices, flash memory devices, or other non-volatile solid-state memory devices. Access to memory 1616 by other components of system 1600, such as the processors 1612 and the peripherals interface 1610, may be controlled by the memory controller 1614.

The peripherals interface 1610 may couple the input and output peripherals of system 1600 to the processor(s) 1612 and memory 1616. The one or more processors 1612 run or execute various software programs and/or sets of instructions stored in memory 1616 to perform various functions for the UAV 100 and to process data. In some embodiments, processors 1312 may include general central processing units (CPUs), specialized processing units such as Graphical Processing Units (GPUs) particularly suited to parallel processing applications, or any combination thereof. In some embodiments, the peripherals interface 1610, the processor(s) 1612, and the memory controller 1614 may be implemented on a single integrated chip. In some other embodiments, they may be implemented on separate chips.

The network communications interface 1622 may facilitate transmission and reception of communications signals often in the form of electromagnetic signals. The transmission and reception of electromagnetic communications signals may be carried out over physical media such copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 1624, including the speaker and microphone 1650, may provide an audio interface between the surrounding environment and the UAV 100. The audio circuitry 1624 may receive audio data from the peripherals interface 1610, convert the audio data to an electrical signal, and transmit the electrical signal to the speaker 1650. The speaker 1650 may convert the electrical signal to human-audible sound waves. The audio circuitry 1624 may also receive electrical signals converted by the microphone 1650 from sound waves. The audio circuitry 1624 may convert the electrical signal to audio data and transmit the audio data to the peripherals interface 1610 for processing. Audio data may be retrieved from and/or transmitted to memory 1616 and/or the network communications interface 1622 by the peripherals interface 1610.

The I/O subsystem 1660 may couple input/output peripherals of UAV 100, such as an optical sensor system 1634, the mobile device interface 1638, and other input/control devices 1642, to the peripherals interface 1610. The I/O subsystem 1660 may include an optical sensor controller 1632, a mobile device interface controller 1636, and other input controller(s) 1640 for other input or control devices. The one or more input controllers 1640 receive/send electrical signals from/to other input or control devices 1642.

The other input/control devices 1642 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1616) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 1638 along with mobile device interface controller 1636 may facilitate the transmission of data between a UAV 100 and other computing device such as a mobile device 104. According to some embodiments, communications interface 1622 may facilitate the transmission of data between UAV 100 and a mobile device 104 (for example, where data is transferred over a local Wi-Fi network).

UAV system 1600 also includes a power system 1618 for powering the various components. The power system 1618 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 1600 may also include one or more image capture devices 1634. FIG. 16 shows an image capture device 1634 coupled to an image capture controller 1632 in I/O subsystem 1660. The image capture device 1634 may include one or more optical sensors. For example, image capture device 1634 may include a charge-coupled device (CCD) or complementary metal-oxide semiconductor (CMOS) phototransistors. The optical sensors of image capture device 1634 receive light from the environment, projected through one or more lens (the combination of an optical sensor and lens can be referred to as a "camera") and converts the light to data representing an image. In conjunction with an imaging module located in memory 1616, the image capture device 1634 may capture images (including still images and/or video). In some embodiments, an image capture device 1634 may include a single fixed camera. In other embodiments, an image capture device 1640 may include a single adjustable camera (adjustable using a gimbal mechanism with one or more axes of motion). In some embodiments, an image capture device 1634 may include a camera with a wide-angle lens providing a wider field of view. In some embodiments, an image capture device 1634 may include an array of multiple cameras providing up to a full 360 degree view in all directions. In some embodiments, an image capture device 1634 may include two or more cameras (of any type as described herein) placed next to each other in order to provide stereoscopic vision. In some embodiments, an image capture device 1634 may include multiple cameras of any combination as described above. In some embodiments, the cameras of image capture device 1634 may be arranged such that at least two cameras are provided with overlapping fields of view at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 1600 may also include one or more proximity sensors 1630. FIG. 16 shows a proximity sensor 1630 coupled to the peripherals interface 1610. Alternately, the proximity sensor 1630 may be coupled to an input controller 1640 in the I/O subsystem 1660. Proximity sensors 1630 may generally include remote sensing technology for proximity detection, range measurement, target identification, etc. For example, proximity sensors 1330 may include radar, sonar, and LIDAR.

UAV system 1600 may also include one or more accelerometers 1626. FIG. 16 shows an accelerometer 1626 coupled to the peripherals interface 1610. Alternately, the accelerometer 1626 may be coupled to an input controller 1640 in the I/O subsystem 1660.

UAV system 1600 may include one or more inertial measurement units (IMU) 1628. An IMU 1628 may measure and report the UAV's velocity, acceleration, orientation, and gravitational forces using a combination of gyroscopes and accelerometers (e.g., accelerometer 1626).

UAV system 1600 may include a global positioning system (GPS) receiver 1620. FIG. 16 shows an GPS receiver 1620 coupled to the peripherals interface 1610. Alternately, the GPS receiver 1620 may be coupled to an input controller 1640 in the I/O subsystem 1660. The GPS receiver 1620 may receive signals from GPS satellites in orbit around the earth, calculate a distance to each of the GPS satellites (through the use of GPS software), and thereby pinpoint a current global position of UAV 100.

In some embodiments, the software components stored in memory 1616 may include an operating system, a communication module (or set of instructions), a flight control module (or set of instructions), a localization module (or set of instructions), a computer vision module, a graphics module (or set of instructions), and other applications (or sets of instructions). For clarity, one or more modules and/or applications may not be shown in FIG. 16.

An operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1644 and may also include various software components for handling data transmission via the network communications interface 1622. The external port 1644 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 1612 may process in real time or near real time, graphics data captured by optical sensor(s) 1634 and/or proximity sensors 1630.

A computer vision module, which may be a component of graphics module, provides analysis and recognition of graphics data. For example, while UAV 100 is in flight, the computer vision module along with graphics module (if separate), GPU 1612, and image capture devices(s) 1634 and/or proximity sensors 1630 may recognize and track the captured image of a subject located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 1608).

Image capture devices(s) 1634, in conjunction with image capture device controller 1632 and a graphics module, may be used to capture images (including still images and video) and store them into memory 1616.

Each of the above identified modules and applications correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 1616 may store a subset of the modules and data structures identified above. Furthermore, memory 1616 may store additional modules and data structures not described above.

Example Computer Processing System

Figure 17:
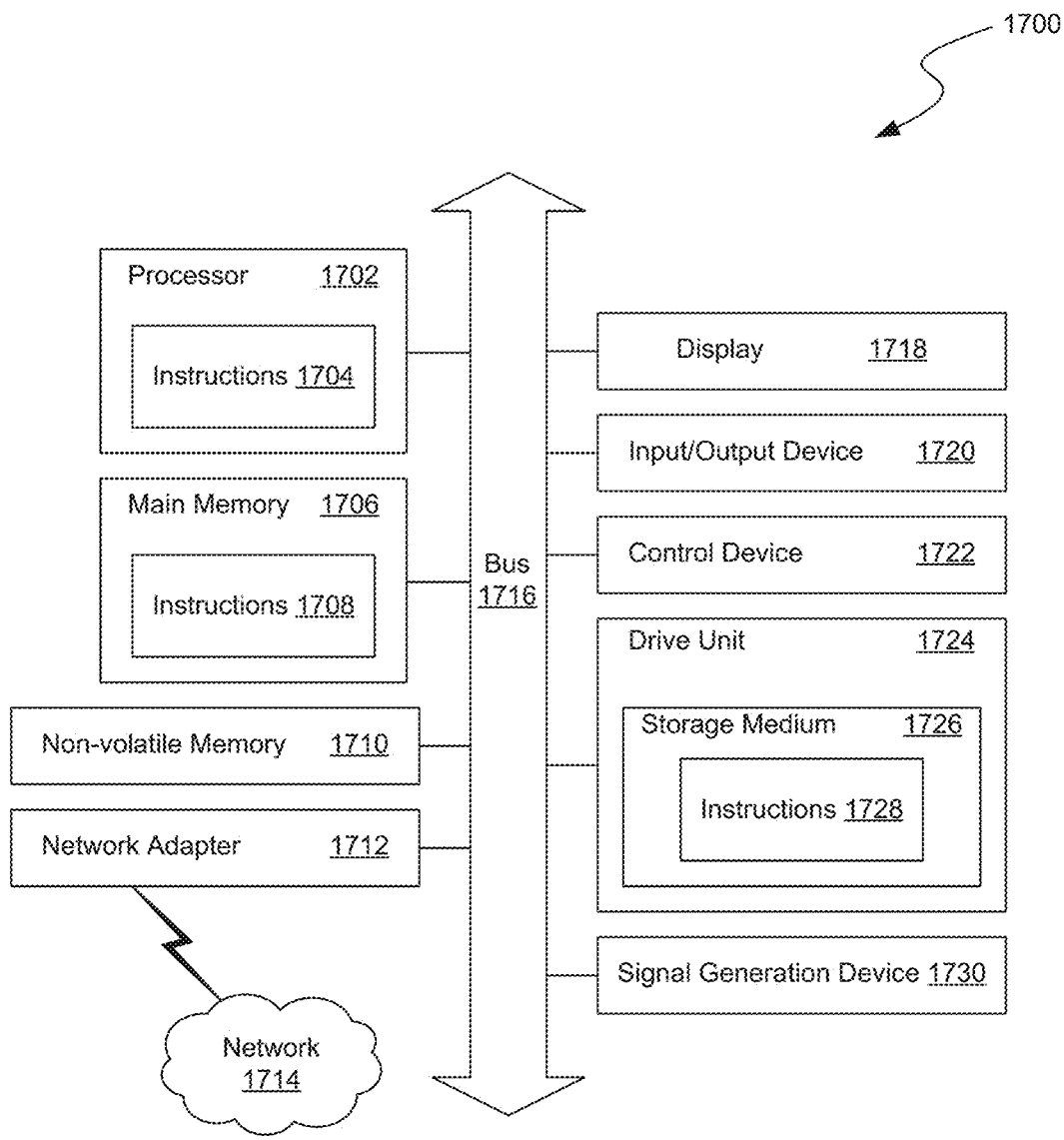
FIG. 17 shows a block diagram of an example of a processing system in which at least some operations described in this disclosure can be implemented.

FIG. 17 is a block diagram illustrating an example of a processing system 1700 in which at least some operations described in this disclosure can be implemented. The example processing system 1700 may be part of any of the aforementioned devices including, but not limited to. UAV 100 and mobile device 104. The processing system 1700 may include one or more central processing units ("processors") 1702, main memory 1706, non-volatile memory 1710, network adapter 1712 (e.g., network interfaces), display 1718, input/output devices 1720, control device 1722 (e.g., keyboard and pointing devices), drive unit 1724 including a storage medium 1726, and signal generation device 1730 that are communicatively connected to a bus 1716. The bus 1716 is illustrated as an abstraction that represents any one or more separate physical buses, point to point connections, or both connected by appropriate bridges, adapters, or controllers. The bus 1716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

In various embodiments, the processing system 1700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1706, non-volatile memory 1710, and storage medium 1726 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1704, 1708, 1728) set at various times in various memory and storage devices in a computer, and that, when read and executed by one or more processing units or processors 1702, cause the processing system 1700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1712 enables the processing system 1700 to mediate data in a network 1714 with an entity that is external to the processing system 1700, such as a network appliance, through any known and/or convenient communications protocol supported by the processing system 1700 and the external entity. The network adapter 1712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for planning the motion of an autonomous vehicle through a physical environment based on an image space analysis of captured images of the physical environment, the method comprising:

receiving, by a computer system, an image of the physical environment, the image captured by an image capture device coupled to the autonomous vehicle;

processing, by the computer system, the received image to identify a region of the image associated with a particular property;

projecting, by the computer system, a predicted three-dimensional (3D) trajectory of the autonomous vehicle through the physical environment into an image space of the received image; and generating, by the computer system, a planned 3D trajectory of the autonomous vehicle through the physical environment based at least in part on an image space analysis of the relationship between the projection of the predicted 3D trajectory and the identified region of the image.

2. The method of claim 1, wherein the particular property of the identified region of the image is a level of uncertainty in estimated depth to objects depicted in the image.

3. The method of claim 1, wherein the predicted 3D trajectory of the autonomous vehicle is based on a previously generated planned 3D trajectory of the autonomous vehicle through the physical environment.

4. The method of claim 1, wherein the autonomous vehicle is an unmanned aerial vehicle (UAV).

5. The method of claim 1, wherein the image capture device is a stereoscopic image capture device.

6. The method of claim 1, wherein processing the received image to identify the region of the image associated with the particular property includes:
for each of a plurality of pixels in the received image:
estimating a depth value for a particular pixel of the plurality of pixels in the received image, the depth value indicative of distance from the autonomous vehicle to a 3D point in the physical environment corresponding to the particular pixel; and
determining a level of confidence of the estimated depth value for the particular pixel;
wherein the identified region includes pixels having estimated depth values below a threshold level of confidence.

7. The method of claim 5, wherein the estimated depth values in the identified region are below the threshold level of confidence due to any of:
poor lighting conditions at a location in the physical environment corresponding to the identified region;
complex shape of a physical object at a location in the physical environment corresponding to the identified region;
substantially uniform texture a physical object at a location in the physical environment corresponding to the identified region; or
an issue with the image capture device.

8. The method of claim 1, wherein processing the received image to identify the region of the image associated with the particular property includes:
for each of a plurality of pixels in the received image:
determining that a particular pixel of the plurality of pixels in the received image corresponds to one or more of a plurality of categories of physical objects;
wherein the identified region includes pixels corresponding to a particular category of physical object.

9. The method of claim 8, wherein determining that a particular pixel of the plurality of pixels in the received image corresponds to one or more of a plurality of categories of physical objects includes applying a machine learning model to classify physical objects depicted in the received image.

10. The method of claim 8, wherein the particular category of physical objects includes trees.

11. The method of claim 8, wherein the particular category of physical objects includes mobile physical objects.

12. The method of claim 1, further comprising:
processing the received image to generate a cost function map based on the image space of the received image, the cost function map associating cost values with a plurality of regions of the received image, wherein a cost value of a given region is indicative of a level of risk associated with travel towards and/or through an area of the physical environment corresponding to the given region.

13. The method of claim 12, wherein the identified region has a higher cost value relative to other regions in the received image.

14. The method of claim 13, wherein generating the planned 3D trajectory of the autonomous vehicle through the physical environment includes:
optimizing the planned 3D trajectory of the autonomous vehicle to minimize an overall cost of the planned 3D trajectory by adjusting the planned 3D trajectory such that the projection of the predicted 3D trajectory avoids the identified region with the higher cost value.

15. The method of claim 12, wherein generating the cost function map includes applying a machine learning model to determine the level of risk associated with travel towards and/or through an area of the physical environment corresponding to the identified region of the received image.

16. The method of claim 1, wherein the planned 3D trajectory of the autonomous vehicle through the physical environment is generated such that the projection of the predicted 3D trajectory avoids overlapping the identified region in the image.

17. The method of claim 1, wherein the planned 3D trajectory of the autonomous vehicle through the physical environment is generated such that the projection of the predicted 3D trajectory points away from the identified region in the image.

18. The method of claim 1, where the planned 3D trajectory is further based at least in part on a generated 3D occupancy map of the physical environment, the generated 3D occupancy map including a plurality of voxels corresponding to 3D spaces in the physical environment that are at least partially occupied by physical objects.

19. The method of claim 18, further comprising:
generating the 3D occupancy map in real-time or near real-time based on images received from the image capture device as the autonomous vehicle is in motion through the physical environment.

20. The method of claim 1, wherein the image space is a spherical plane surrounding the autonomous vehicle.

21. The method of claim 1, wherein processing the received image to identify the region of the image associated with the particular property includes processing a sequence of a plurality of frames in a video feed.

22. An unmanned aerial vehicle (UAV) configured for autonomous flight through a physical environment, the UAV comprising:
an image capture device configured to capture images of the physical environment;
a visual navigation system configured to:
receive an image of the physical environment captured by the image capture device;
process the received image to identify a region of the image associated with a particular property;
project a predicted three-dimensional (3D) trajectory of the UAV through the physical environment into an image space of the received image; and
optimize a planned 3D trajectory of the UAV through the physical environment based at least in part on an image space analysis of the relationship between the projection of the predicted 3D trajectory and the identified region of the image.

23. The UAV of claim 22, wherein the visual navigation system is further configured to:

generate a 3D occupancy map of the physical environment based on images received from the image capture device while the UAV is in flight through the physical environment, the generated 3D occupancy map including a plurality of voxels corresponding to 3D spaces in the physical environment that are at least partially occupied by physical objects; and generate the planned 3D trajectory of the UAV through the physical environment based at least in part on the generated 3D occupancy map.

24. The UAV of claim 22, wherein the planned 3D trajectory of the UAV through the physical environment is optimized such that the projection of the predicted 3D trajectory avoids the identified region in the image.

25. The UAV of claim 22, wherein the image space is a spherical plane surrounding the UAV.

26. The UAV of claim 22, wherein the visual navigation system is further configured to generate control commands configured to cause the UAV to autonomously fly along the updated planned 3D trajectory.

* * * * *